United States Patent [19]

Ogawa et al.

[11] Patent Number: 5,383,375
[45] Date of Patent: Jan. 24, 1995

[54] GEAR SPEED CHANGE SYSTEM WITH TWO COUNTER SHAFTS

[75] Inventors: Shinji Ogawa; Tomoyuki Kanou; Yusuke Horiuchi, all of Toyota, Japan

[73] Assignee: Toyota Jidosha Kabushiki Kaisha, Toyota, Japan

[21] Appl. No.: 85,047

[22] Filed: Jul. 2, 1993

[30] Foreign Application Priority Data

Jul. 2, 1993 [JP] Japan .................. 4-199087

[51] Int. Cl.$^6$ ............................... F16H 3/097
[52] U.S. Cl. ........................... 74/330; 74/331
[58] Field of Search ........................ 74/330, 331

[56] References Cited

U.S. PATENT DOCUMENTS

| | | | |
|---|---|---|---|
| 2,612,787 | 10/1952 | Youngren et al. | 74/330 |
| 2,654,261 | 10/1953 | Youngren et al. | 74/330 |
| 4,428,247 | 1/1984 | Young | 74/331 |
| 4,463,621 | 8/1984 | Fisher | 74/330 |
| 4,584,891 | 4/1986 | Mori | 74/331 |
| 4,738,149 | 4/1988 | Janiszewski | 74/330 |

*Primary Examiner*—Dirk Wright
*Attorney, Agent, or Firm*—Oblon, Spivak, McClelland, Maier, & Neustadt

[57] ABSTRACT

A gear speed change system includes an input shaft, an output shaft coaxial therewith, a first counter shaft disposed parallel to the input and output shafts, and a second counter shaft coaxial with the first counter shaft. The input shaft and the first counter shaft, and the second counter shaft and the output shaft are coupled at a fixed ratio, respectively. One of gear sets selectively couples the input shaft to the second counter shaft and the output shaft to the first counter shaft, respectively. A clutch is provided between the first and the second counter shafts. With this construction, speed changes by the first counter shaft, the second counter shaft, and the combination of the first and second counter shafts may be effected, thereby reducing the number of required gear sets as compared with that of the speed change steps. The first counter shaft and the second counter shaft may be replaced with each other.

10 Claims, 22 Drawing Sheets

GEAR SPEED CHANGE SYSTEM WITH TWO COUNTER SHAFTS

BACKGROUND OF THE INVENTION

1. Field of the Invention

This invention relates to multiple stage gear speed change systems and, more particularly, to a speed change system, which can obtain a wide speed change ratio range and has reduced necessary gear sets so that it is suited for mounting in vehicles.

2. Prior Art

FIG. 20(A) accompanying the specification schematically shows a well-known gear speed change system. This speed change system comprises an input shaft, an output shaft disposed coaxially therewith, and a counter shaft disposed parallel to the input and output shafts. The input and counter shafts are coupled by a gear pair or set A to each other at all times. More specifically, a gear rotatable in unison with the input shaft and a gear rotatable in unison with the counter shaft are in mesh with each other and form the gear set A coupling the input and counter shafts at all times. The counter and output shafts are coupled by a plurality of gear sets to each other. These gear sets are each formed by at least two gears, at least one of which is rotatable relative to the output or counter shaft. A clutch is disposed adjacent the gear sets. The clutch can render one of the plural gear sets unable to rotate relative to the output and counter shafts while rendering the other gear sets able to rotate relative to the output or counter shaft. The plurality of gear sets individually have different speed reduction ratios. In the Figure, the solid frame between shafts indicates a gear set which is coupled at all times, and dashed frames indicate gear sets which are coupled and de-coupled by the clutch.

In the example of system shown in FIG. 20(A), "reverse" is set up when the gear set B is coupled, "first forward" is set up when the gear set C is coupled, "second forward" is set up when the gear set D is coupled, "third forward" is set up when the gear set E is coupled, "fourth forward" is set up when the input and output shafts are coupled directly, and "fifth forward" is set up when the gear set F is coupled. The system has a total of six gear sets.

In this type of speed change system, if it is desired to obtain a wide speed change ratio range, it is necessary to greatly change the gear diameters of the first and fifth forward gear sets C and F, thus posing limitation on the practically realizable speed change ratio range.

Japanese Laid-Open Utility Model Publications Nos. 1-169644 and 2-146335 disclose techniques for solving the above problem. In the disclosed techniques, two counter shafts are used as shown in FIG. 20(B) accompanying the specification. Actually, the two counter shafts are disposed coaxially. Of the two counter shafts, one (i.e., a second counter shaft in the illustrated case) is for low speed, and the other (which is a first counter shaft in this case) is for high speed. The input shaft is coupled at all times to the second and first counter shafts by gear sets D and A, respectively. The second counter shaft for low speed is rotated at a lower speed than the first counter shaft for high speed. The output and second counter shafts are coupled by low speed gear sets E to G, and the output and first counter shafts are coupled by high speed gear sets B and C. A clutch can selectively cause the gear sets B and C and those E to G to transmit torque, and it is possible to realize five different speed change ratios each by selectively coupling each of the five gear sets B to G for torque transmission. In addition, a further speed change ratio is obtainable by coupling the input and output shafts directly. That is, a total of six speed change ratios are available for selection. Thus, this speed change system, like that shown in FIG. 20(A), is a reverse 1, forward 5 speed change ratio system. In this case, the rotational speeds of the two counter shafts can be changed greatly to provide a great span between the first and fifth forward speed change ratios, that is, it is possible to obtain a wide speed change ratio range.

While the structure shown in FIG. 20(B), using two counter shafts, can provide a wide speed change ratio range, a gear set is necessary between the input shaft and each of the two counter shafts, that is, one more gear set is necessary than those in the structure shown in FIG. 20(A). With the structure shown in FIG. 20(A), on the other hand, a sufficiently wide speed change ratio range can not be obtained.

SUMMARY OF THE INVENTION

An object of the invention is to provide a gear speed change system using two counter shafts, which has reduced gear sets while ensuring a sufficiently wide speed change ratio range.

According to a first aspect of the invention, there is provided a gear speed change system as schematically shown in FIG. 21. This gear speed change system comprises an input shaft, an output shaft disposed coaxially therewith, a first counter shaft disposed parallel to the input and output shafts, and a second counter shaft disposed coaxially with the first counter shaft (while being shown at a different position in FIG. 21 for the sake of convenience of illustration).

In this system, the input shaft is coupled to one of the first and second counter shafts at all times by a gear set having gears respectively rotatable in unison with the input shaft and the afore-mentioned one counter shaft. In examples of the system shown in (1), (3) and (3a) in FIG. 21, the first counter shaft is coupled to the input shaft at all times, and in examples shown in (2) and (4), the second counter shaft is coupled to the input shaft at all times. In the cases shown in (1), (3) and (3a), the afore-mentioned one counter shaft is the first counter shaft, while in the cases shown in (2) and (4), it is the second counter shaft.

The other counter shaft than the afore-mentioned one of the first and second counter shafts is coupled to the output shaft at all times by a gear set having gears respectively rotatable in unison with the other counter and output shafts. In the cases of (1), (3) and (3a), the second counter shaft is coupled to the output shaft at all times, and in the cases of (2) and (4), the first counter shaft is coupled to the output shaft at all times.

The afore-mentioned one counter shaft (which is the first counter shaft in the cases of (1), (3) and (3a) and the second counter shaft in the cases of (2) and (4)) and the output shaft are coupled by at least one gear set to each other. This gear set includes a gear which is rotatable relative to the afore-mentioned one counter shaft or the output shaft, and can be switched by a first clutch between states capable and incapable of the relative rotation.

The afore-mentioned other counter shaft (which is the second counter shaft in the cases of (1), (3) and (3a) and the first counter shaft in the cases of (2) and (4)) and the input shaft are coupled by at least one gear set to each other. This gear set includes a gear which is rotatable relative to the afore-mentioned other counter shaft and the input shaft, and can be switched by a second clutch between states capable and incapable of the relative rotation.

A third clutch is further disposed between the first and second counter shafts. This third clutch is for switching the first and second counter shafts between states capable and incapable of relative rotation.

With the speed change system according to the first aspect of the invention, speed changes by the first counter shaft, those by the second counter shaft and those by both the first and second counter shafts can be realized, and thus it is possible to obtain a wide speed change ratio range. Besides, the system has no extra gear set.

According to a second aspect of the invention, there is provided a gear speed change system as shown in FIG. 22. This speed change system again comprises an input shaft, an output shaft, and a first and a second counter shaft, these shafts being in the same dispositional relation as in the speed change system according to the first aspect of the invention.

In this system, one of the input and output shafts and the first counter shaft are coupled to each other at all times by a gear set which has gears respectively rotatable in unison with the afore-mentioned one shaft and the first counter shaft. In examples of the system shown in (1), (3), (3a) and (5) in FIG. 22, the afore-mentioned one shaft is the input shaft, while in examples shown in (2) and (4), it is the output shaft.

The other shaft than that coupled at all times to the first counter shaft is coupled to the first counter shaft by at least one gear set to each other. This gear set includes a gear which is rotatable relative to the afore-mentioned other shaft or the first counter shaft, and can be switched by a first clutch between states capable and incapable of the relative rotation.

One of the input and output shafts and the second counter shaft are coupled to each other at all times by a gear set having gears respectively rotatable in unison with the afore-mentioned one shaft and the second counter shaft. In the cases shown in (1) and (3) in FIG. 22, the aforementioned one shaft is the input shaft, while in the cases shown in (2), (3a), (4) and (5), it is the output shaft.

The other shaft than that coupled at all times to the second counter shaft is coupled to the second counter shaft by at least one gear set to each other. This gear set includes a gear which is rotatable relative to the afore-mentioned other shaft or the second counter shaft, and can be switched by a second clutch between states capable and incapable of the relative rotation.

Of the gear set which is provided between the first counter shaft and the afore-mentioned other shaft and which can be switched by the first clutch, and the gear set which is provided between the second counter shaft and the aforementioned other shaft and which can be switched by the second clutch, at least one gear set is a common gear set. In the cases shown in (1) and (2) in FIG. 22, the gear set designated at D is the common gear set, in the cases shown in (3), (3a) and (4), the gear set designated at E is the common gear set, and in the case shown in (5), the gear set designated at F is the common gear set. As shown in FIG. 22, one of the outer gear sets among plural gear sets coupled or de-coupled by the first or the second clutch is used as a common gear set.

With the speed change system according to the second aspect of the invention, the common gear set can be switched between states rotatable relative to the first and second counter shafts, respectively. Thus, the number of gear sets involved is reduced. In addition, with the use of the first and second counter shafts a sufficiently wide speed change ratio range can be obtained.

The invention will be more fully understood by reading the detailed description of the preferred embodiments and also the claims with reference to the accompanying drawings.

DETAILED DESCRIPTION OF THE PREFERRED EMBODIMENTS

Preferred embodiments of the invention will now be described with reference to the drawings. First, a first to a tenth embodiment according to the first aspect of the invention will be described. These embodiments each concern a one reverse, five forward speed change system. However, this number of attainable speed change ratios is by no means limitative. Further, throughout these embodiments, like or corresponding parts are given like reference numbers, and their description will not be repeated.

First Embodiment

Figure 1:
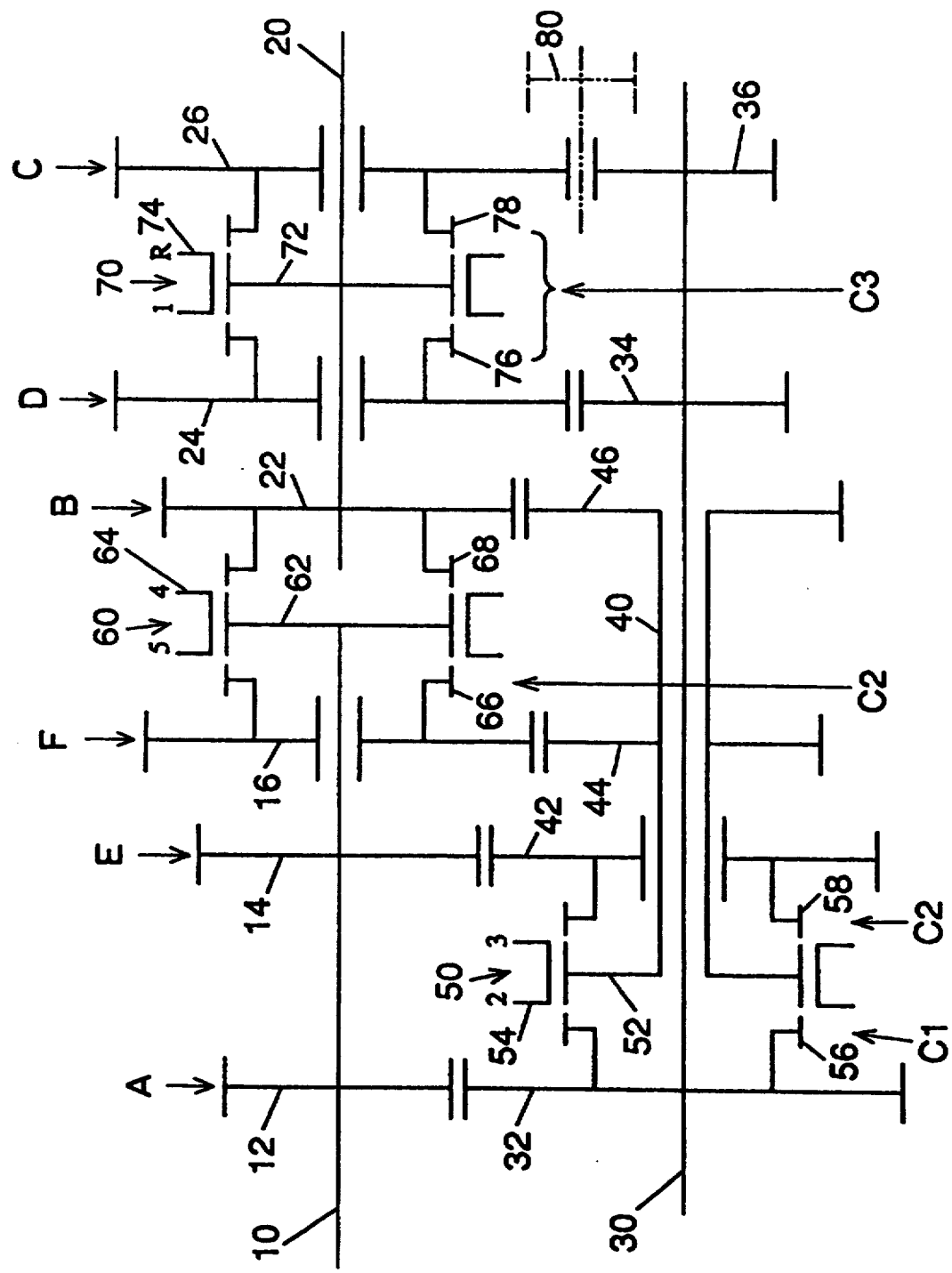
FIG. 1 is a skeleton diagram showing a first embodiment of the gear speed change system.

FIG. 1 is a skeleton diagram showing a one reverse, five forward speed change system. The system has an input shaft 10, to which engine driving power is transmitted via a friction clutch (not shown) as is well known in the art. The system also has an output shaft 20 which is provided coaxially with and on the rear side (i.e., on the right side in the Figure) of the input shaft 10. The system further has a first counter shaft 30 and a second counter shaft 40 coaxially provided therearound, these counter shafts having the axis thereof extending parallel to the input and output shafts 10 and 20. The shafts 10, 20, 30 and 40 are supported for relative rotation by bearings in side or intermediate walls of a speed change system housing (not shown).

The input shaft 10 has a first to a third input gear 12, 14 and 16 which are disposed in the mentioned order from the front side (i.e., the left side in FIG. 1). Of these input gears, the first and second input gears 12 and 14 are rotatable in unison with the input shaft 10, while the third input gear 16 is rotatable relative thereto.

The output shaft 20, likewise, has a first to a third output gear 22, 24 and 26 which are disposed in the mentioned order from the front side. Of these output gears, the first output gear 22 is rotatable in unison with the output shaft 20, while the second and third output gears 24 and 26 are rotatable relative thereto.

The first counter shaft 30 has a counter gear 32, which is in mesh with the first input gear 12 of the input shaft 10 and rotatable in unison with the first counter shaft 30. The first input and counter gears 12 and 32 form a first gear set A for transmitting the rotation of the input shaft 10 to the first counter shaft 30 at all times.

The first counter shaft 30 has further counter gears 34 and 36 for rotation in unison therewith. The counter gear 34 is in mesh with the second output gear 24 of the output shaft 20, and the counter gear 36 is in mesh with the third output gear 26 of the output shaft 20 via a reverse drive gear 80. The second output and counter gears 24 and 34 form a fourth gear set D, and the third output and counter gears 26 and 36 form a third gear set C.

The second counter shaft 40 has a counter gear 42 rotatable relative thereto and in mesh with the second input gear 14 of the input shaft 10. The second counter shaft 40 also has a counter gear 44 rotatable in unison therewith and in mesh with the third input gear 16 of the input shaft 10. The second input and counter gears 14 and 42 form a fifth gear set E, and the third input and counter gears 16 and 44 form a sixth gear set F. The second counter shaft 40 has a further counter gear 46 rotatable in unison therewith and in mesh with the first output gear 22 of the output shaft 20. The first output and counter gears 22 and 46 form a second gear set B between the second counter and output shafts 40 and 20.

A second/third forward clutch 50 is provided between the counter gears 32 and 42 of the respective first and second counter shafts 30 and 40. The clutch 50 mainly includes a clutch hub 52 rotatable in unison with the second counter shaft 40, a hub sleeve 54 splined to the outer periphery of the hub 52 for displacement to the right and left in the Figure, and spline teeth 56 and 58 integral with the respective counter gears 32 and 42.

By displacing the hub sleeve 54 to the right or left from the illustrated neutral position, inner spline teeth of the hub sleeve 54 are brought into selective mesh with either of the spline teeth 56 and 58 of the counter gears 32 and 42 while in mesh with outer spline teeth of the clutch hub 52. In other words, with displacement of the hub sleeve 54 to the left, the counter gear 32 rotating in unison with the first counter shaft 30 is coupled to the second counter shaft 40 for transmission of rotation. In this case, the gear speed change system provides a second forward speed change ratio as will be described later. In this state, the relative rotation of the first and second counter shafts 30 and 40 is inhibited, and the two counter shafts are rotated at an equal speed. By displacing the hub sleeve 54 to the inverse side, i.e., to the right, the relative rotation of the second counter shaft 40 and the counter gear 42 is inhibited. In this state, the gear speed change system provides a third forward speed change ratio.

In this clutch 50, the side thereof for attaining the second forward speed change ratio functions as a clutch C1 for coupling the counter gear 32 (i.e., the first counter shaft 30) and the second counter shaft 40 for transmission of rotation. The side of the clutch 50 for attaining the third forward speed change ratio functions as a clutch C2 for coupling the counter gear 42 to the second counter shaft 40 for transmission of rotation as noted above.

A fourth/fifth forward clutch 60 is provided between the third input gear 16 of the input shaft 10 and the first output gear 22 of the output shaft 20. The clutch 60 mainly includes a clutch hub 62 rotatable in unison with the input shaft 10, a hub sleeve 64 splined to the outer periphery of the hub 62 for displacement to the right and left in the Figure, and spline teeth 66 and 68 integral with the respective third input and first output gears 16 and 22.

Again in this clutch 60, by displacing the hub sleeve 64 to the right or left from the illustrated neutral position, inner spline teeth of the hub sleeve 64 are brought into selective mesh with either of the spline teeth 66 and 68 of the third input and first output gears 16 and 22. In other words, by displacing the hub sleeve 64 to the left, the input shaft 10 and the third input gear 16 are coupled to each other for transmission of rotation, and the gear speed change system attains a fifth forward speed change ratio as will be described hereinafter. On the other hand, by displacing the hub sleeve 64 to the reverse side, i.e., to the right, the input shaft 10 and the first output gear 22 are coupled to each other for transmission of rotation, and the gear speed change system attains a fourth forward speed change ratio. In this case, the input and output shafts 10 and 20 are coupled to each other directly and rotated at an equal speed.

A first forward/reverse clutch 70 is provided on the output shaft 20 between the second and third output gears 24 and 26. The clutch 70 mainly includes a clutch hub 72 rotatable in unison with the output shaft 20, a hub sleeve 74 splined to the outer periphery of the hub 72 for displacement to the left and right in the Figure, and spline teeth 76 and 78 integral with the respective second and third output gears 24 and 26.

In the clutch 70, by displacing the hub sleeve 74 to the left and right from the illustrated neutral position, inner spline teeth of the hub sleeve 74 is brought into selective mesh with either of the spline teeth 76 and 78 of the second and third output gears 24 and 26. In other words, by displacing the hub sleeve 74 to the left, the output shaft 20 and second output gear 24 are coupled to each other such that they can not be rotated relative to each other, and the gear speed change system attains a first forward speed change ratio. By displacing the hub sleeve 74 to the right, on the other hand, the output shaft 20 and the third output gear 26 are coupled such that they can not be rotated relative to each other, and the gear speed change system attains a reverse speed change ratio.

This clutch 70 functions as a clutch C3 for coupling either of the second and third output gears 24 and 26 to the output shaft 20 for transmission of rotation.

The speed change operation of the gear speed change system having the above construction will now be described In the neutral state of the gear speed change system, the rotation of the input shaft 10 is being transmitted via the mesh between the first input gear 12 and the counter gear 32 to the first counter shaft 30, and rotation from the second input gear 14 is being transmitted to the counter gear 42 in mesh, thus causing rotation of the counter gear 42 relative to the second counter shaft 40. The rotation of the first counter shaft 30 is being transmitted via the counter gear 34 thereof to the second output gear 24 and thence via the counter gear 36 and a reverse drive gear 80 to the third output gear 26. In this state, the second and third output gears 24 and 26 are rotating relative to the output shaft 20 and in mutually opposite directions.

By displacing the hub sleeve 74 in the first fourth-/fifth clutch 70 to the left in the Figure, the second output gear 24 and the output shaft 20 are coupled to each other for transmission of rotation as noted above, and the rotation of the second output gear 24 is transmitted to the output shaft 20 to attain the first forward speed change ratio. By displacing the hub sleeve 74 to the right in the Figure, the third output gear 26 and the output shaft 20 are coupled to each other for transmission of rotation, and the rotation of the third output gear 26 is transmitted to the output shaft 20 to attain the reverse speed change ratio.

By displacing the hub sleeve 54 in the second/third forward clutch 50 to the left in the Figure, the first and second counter shafts 30 and 40 are coupled such that they can not be rotated relative to each other as noted above. Thus, the rotation of the first counter shaft 30 is transmitted via the second counter shaft 40 and the mesh between the counter gear 46 thereon and the first output gear 22 to the output shaft 20 to attain the second forward speed change ratio. Further, by displacing the hub sleeve 54 to the right in the Figure, the counter gear 42 in mesh with the second input gear 14 is coupled to the second counter shaft 40 for transmission of rotation. Thus, the rotation of the input shaft 10 is transmitted via the second counter shaft 40 and the mesh between the counter gear 46 thereon and the first output gear 22 to the output shaft 20 to attain the third forward speed change ratio.

By displacing the hub sleeve 64 in the fourth/fifth forward clutch 60 to the left in the Figure, the third input gear 16 in mesh with the second counter shaft 40 is coupled to the input shaft 10 for transmission of rotation. Thus, the rotation of the input shaft 10 is transmitted via the mesh between the third input gear 16 and the counter gear 44 to the second counter shaft 40. The rotation of the second counter shaft 40 is transmitted via the mesh between the counter gear 46 and the first output gear 22 to the output shaft 20 to attain the fifth speed change ratio. By displacing the hub sleeve 64 to the right in the Figure, the input and output shafts 10 and 20 are coupled directly to each other to attain the fourth speed change ratio.

Figure 21:
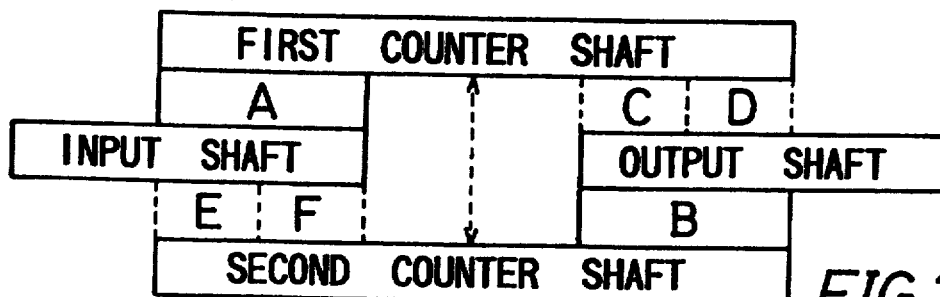
FIG. 21 is a view schematically showing a gear speed change system scheme according to a first aspect of the invention.
Figure 21:
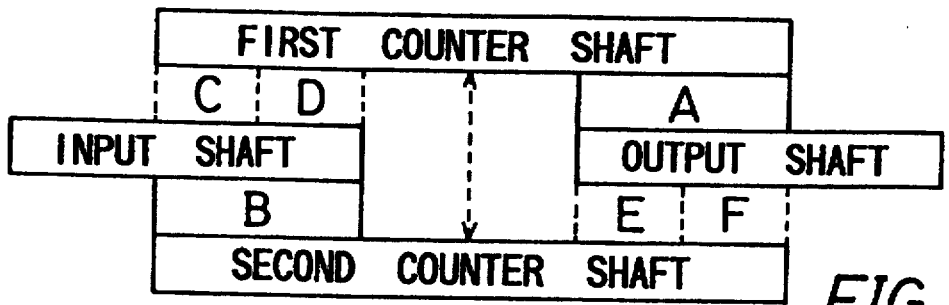
Figure 21:
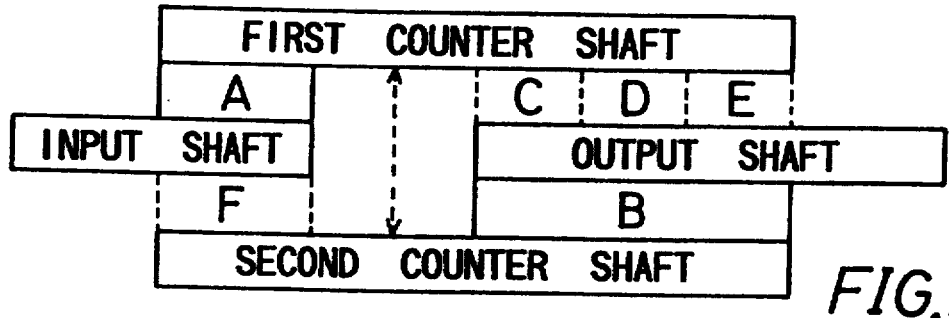
Figure 21:
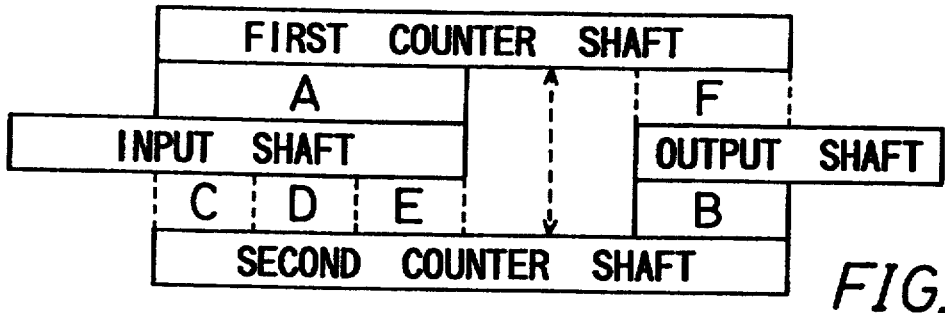
Figure 21:
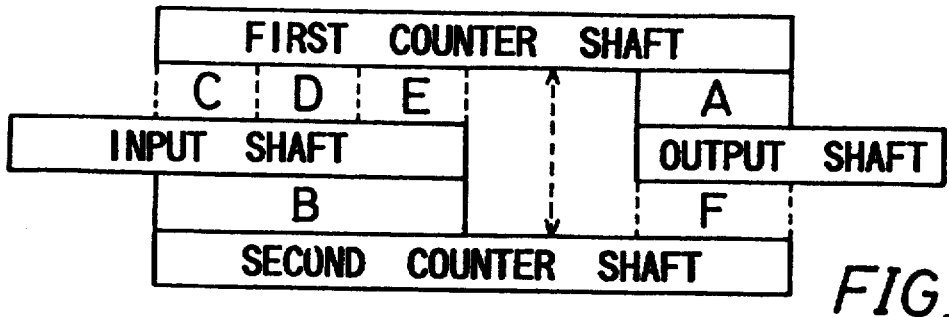

As will be understood from the above description, this embodiment corresponds to the arrangement shown in (1) in FIG. 21. That is, the input and first counter shafts 10 and 30 are coupled to each other by the first gear set A of the gears 12 and 32 secured to the respective input and first counter shafts 10 and 30.

The output and second counter shafts 10 and 40 are coupled to each other by the second gear set B of the gears 22 and 46 secured to the respective output and second counter shafts 20 and 40.

The output and first counter shafts 20 and 30 are coupled to each other by the third and fourth gear sets C and D, the third gear set C consisting of the gears 26, 80 and 36, the fourth gear set D consisting of the gears 24 and 34, at least one of the gears of each of the gear sets C and D, in the instant case the gears 24 and 26, being rotatable relative to at least one of the output and first counter shafts 20 and 30, in this instance the output shaft 20. The clutch 70 can allow and inhibit the idling of the gears 24 and 26.

The input and second counter shafts 10 and 40 are coupled to each other by the fifth and sixth gear sets E and F, the fifth gear set E consisting of the gears 14 and 42, the sixth gear set F consisting of the gears 16 and 44, at least one of the gears of each of the gear sets E and F, in this instance the gear 42, being rotatable relative to the second counter shaft 40 while the gear 16 being rotatable relative to the input shaft 10. The clutch C2 can allow and inhibit the relative rotation of the gear 42, and the sleeve 60 can allow and inhibit the relative rotation of the gear 16. This arrangement constitutes the second clutch between the input and second counter shafts 10 and 40.

The clutch C1 is provided between the first and second counter shafts 30 and 40 to allow and inhibit the relative rotation of the first and second counter shafts 30 and 40 to each other.

In the above way, the arrangement shown in (1) in FIG. 21 is realized.

Second Embodiment

This embodiment corresponds to the arrangement shown in (2) in FIG. 21.

Figure 2:
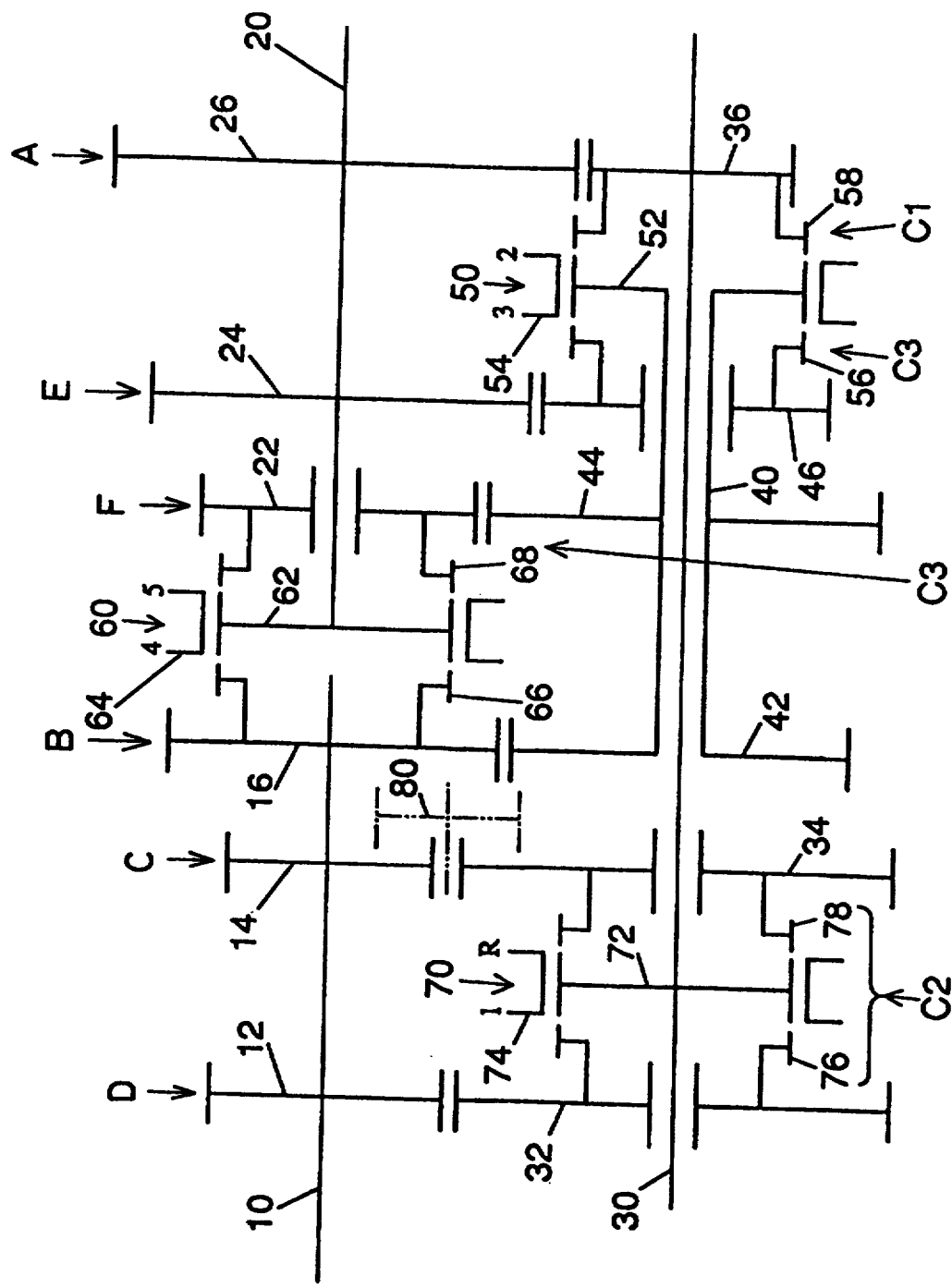
FIG. 2 is a skeleton diagram showing a second embodiment of the gear speed change system.

FIG. 2 shows this gear speed change system. The second/third forward clutch 50 is formed between the counter gears 46 and 36. The counter gear 46 is rotatable relative to the second counter shaft 40 and the counter gear 36 is rotatable in unison with the first counter shaft 30. The clutch hub 52 of the clutch 50 is rotatable in unison with the second counter shaft 40. By displacing the hub sleeve 54 to the left and right from the illustrated neutral position, inner spline teeth of the hub sleeve 54 are brought into selective mesh with either of the spline teeth 56 and 58 of the respective counter gears 46 and 36. The gear speed change system this attains either the second or the third speed change ratio.

The fourth/fifth forward clutch 60 is formed between the third input gear 16 rotatable in unison with the input shaft 10 and the first output gear 22 rotatable relative to the output shaft 20. The clutch hub 62 of the clutch 60 is rotatable in unison with the output shaft 20. By displacing the hub sleeve 64 to the left and right from the illustrated neutral position, inner spline teeth of the hub sleeve 64 are brought into selective mesh with either of the spline teeth 66 and 68 of the respective third input and first output gears 16 and 22. The gear speed change system thus attains either the fourth forward speed change ratio with direct coupling of the input and output shafts 10 and 20 or the fifth forward speed change ratio.

The first forward/reverse clutch 70 is formed between the counter gears 32 and 34 mounted on and rotatable relative to the first counter shaft 30. The clutch hub 72 of the clutch 70 is rotatable in unison with the first counter shaft 30. By displacing the hub sleeve 74 to the left and right from the illustrated neutral position, inner spline teeth of the hub sleeve 74 are brought into selective mesh with either of the spline teeth 76 and 78 of the respective counter gears 32 and 34. The gear speed change system thus attains either of the first forward and reverse speed change ratios.

This embodiment is a specific example of the arrangement shown in (2) in FIG. 21. Its output and first counter shafts 20 and 30 are coupled to each other by the first gear set A formed by the gears 26 and 36 secured to the respective output and first counter shafts 20 and 30, which are in turn coupled to each other at all times by the first gear set A. The input and second counter shafts 10 and 40 are coupled to each other by the second gear set B of the gears 16 and 42 secured to the respective input and second counter shafts 10 and 40, which are in turn coupled to each other at all times by the second gear set B.

The input and first counter shafts 10 and 30 are coupled to each other by the third and fourth gear sets C and D, the third gear set C being formed by the gears 14 and 34 and reverse idler gear 80, the gear 34 being rotatable relative to the first counter shaft 30, the fourth gear set D being formed by the gears 12 and 32, the gear 32 being rotatable relative to the first counter shaft 30.

The output and second counter shafts 20 and 40 are coupled to each other by the fifth and sixth gear sets E and F, the fifth gear E being formed by the gears 24 and 46, the gear 46 being rotatable relative to the second counter shaft 40, the sixth gear set F being formed by the gears 22 and 44, the gear 22 being rotatable relative to the output shaft 20.

The clutch C1 is formed between the first and second counter shafts 30 and 40 to allow and inhibit the relative rotation of the first and second counter shafts 30 and 40. As is obvious from the above, this embodiment realizes the arrangement shown in (2) in FIG. 21.

Third Embodiment

Figure 3:
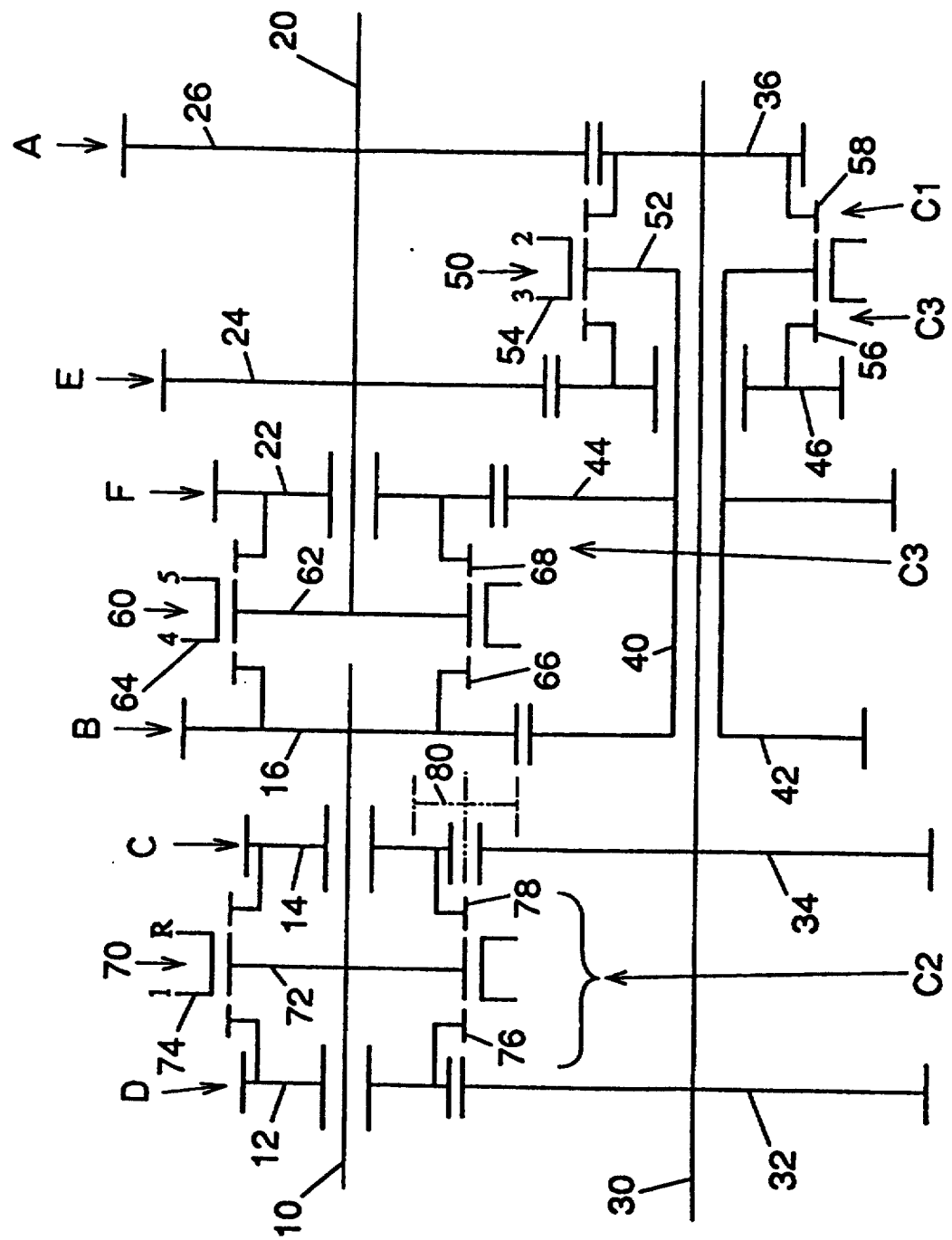
FIG. 3 is a skeleton diagram showing a third embodiment of the gear speed change system.

FIG. 3 shows this gear speed change system which is the same as the preceding second embodiment except that the first forward/reverse clutch 70 is formed between the first input gear 12 and the second input gear 14 mounted on and rotatable relative to the first input shaft 10. This embodiment also corresponds to the arrangement shown in (2) in FIG. 21. As shown therein, the gear set coupled and de-coupled by the clutch may have a gear which is rotatable relative to at least one shaft.

Fourth Embodiment

Figure 4:
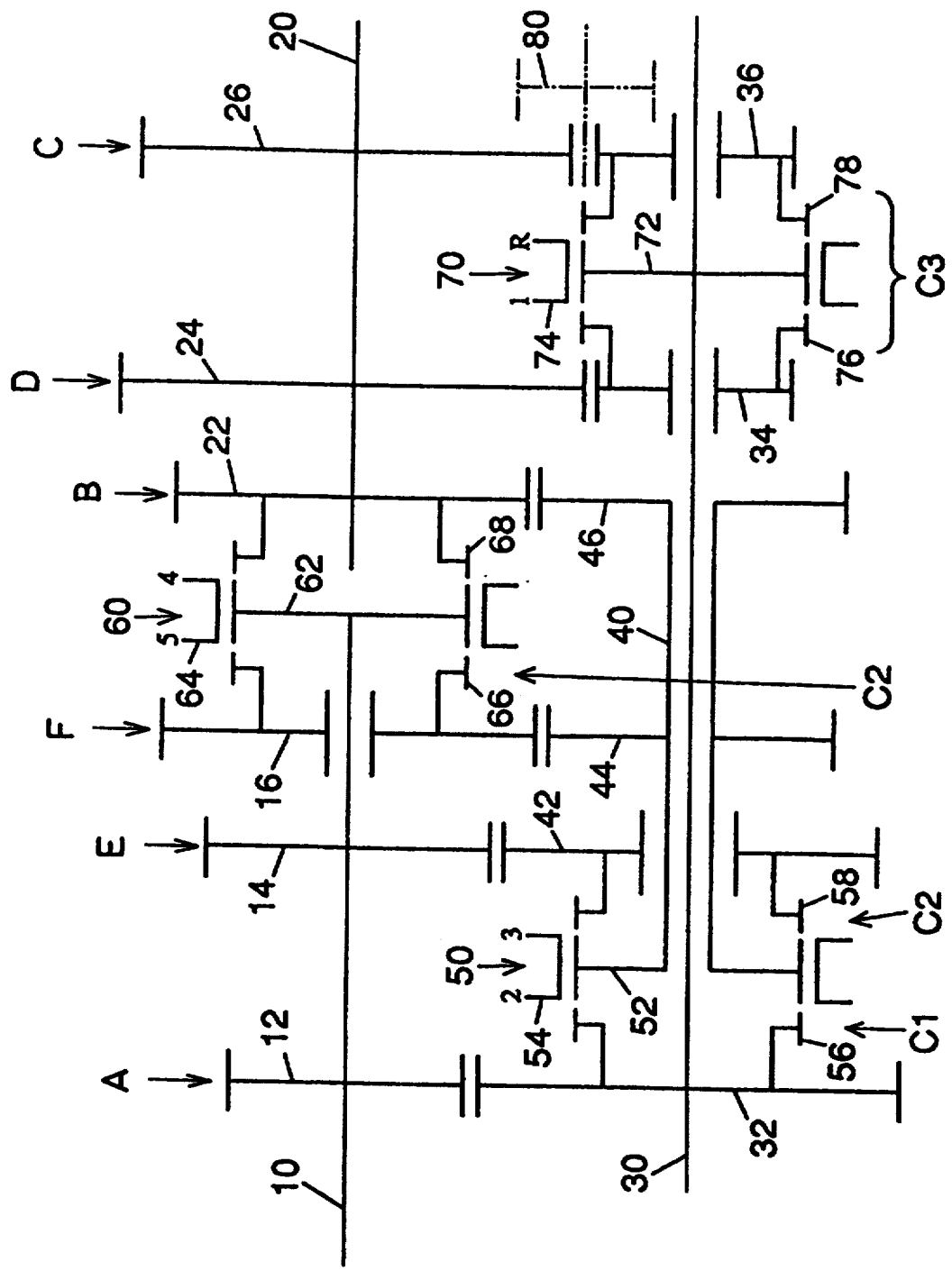
FIG. 4 is a skeleton diagram showing a fourth embodiment of the gear speed change system.

FIG. 4 shows this gear speed change system which is a modification of the preceding first embodiment and which has the same structure thereas except that the first forward/reverse clutch 70 is formed between the counter gears 34 and 36 mounted on and rotatable relative to the first counter shaft 30. This embodiment corresponds to the arrangement shown in (1) in FIG. 21.

Fifth Embodiment

This embodiment corresponds to the arrangement shown in (2) in FIG. 21.

Figure 5:
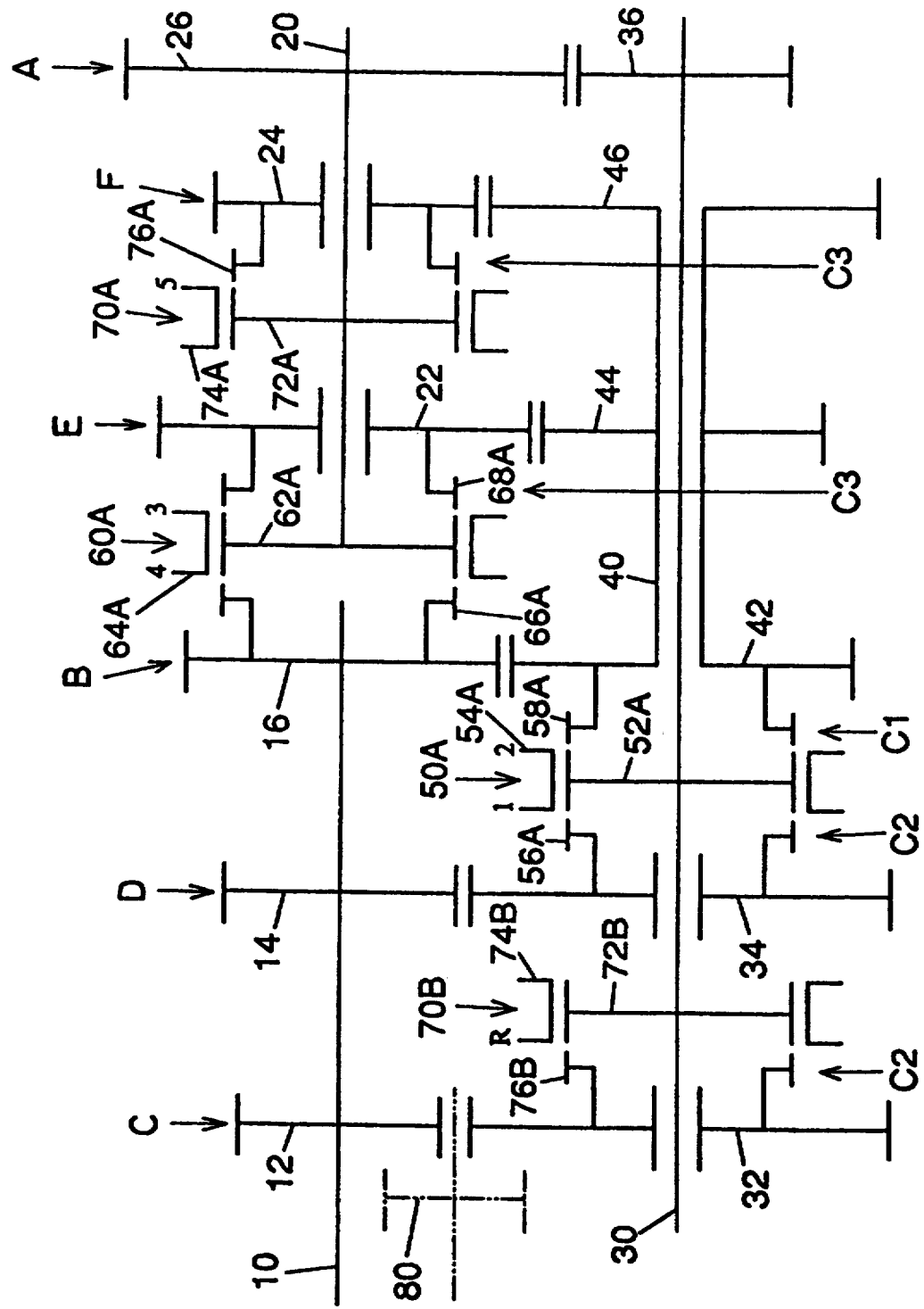
FIG. 5 is a skeleton diagram showing a fifth embodiment of the gear speed change system.

FIG. 5 shows this gear speed change system. A first-/second forward clutch 50A is formed between the counter gear 34 mounted on and rotatable relative to first counter shaft 30 and the counter gear 42 mounted on and rotatable in unison with second counter shaft 40. A clutch hub 52A of the clutch 50A is rotatable in unison with first counter shaft 30. By displacing a hub sleeve 54A to the left and right from the illustrated neutral position, inner spline teeth of the hub sleeve 54A are brought into selective mesh with spline teeth 56A and 58A of the respective counter gears 34 and 42, and the gear speed change system thus attains either of the first and second forward speed change ratios. When the second forward speed change ratio is set up, the relative rotation of the first and second counter shafts 30 and 40 is inhibited.

A third/fourth clutch 60A is formed between the third input gear 16 mounted on and rotatable in unison with input shaft 10 and the first output gear 22 mounted on and rotatable relative to output shaft 20. A clutch hub 62A of the clutch 60A is rotatable in unison with the output shaft 20. By displacing a hub sleeve 64A of the clutch 60A to the left and right from the illustrated neutral position, inner spline teeth of the hub sleeve 64A are brought into selective mesh with spline teeth 66A and 68A of the respective third input and first output gears 16 and 22. The gear speed change system thus attains either the fourth forward speed change ratio with direct coupling of the input and output shafts 10 and 20 or the third forward speed change ratio.

A fifth forward clutch 70A is formed adjacent the second output gear 24 mounted on and rotatable relative to the output shaft 20. A clutch hub 72A of the clutch 70A is rotatable in unison with the output shaft 20. By displacing a hub sleeve 74A to the right from the illustrated neutral position, inner spline teeth of the hub sleeve 74A are brought into mesh with spline teeth 76A of the second output gear 24. The gear speed change system thus attains the fifth forward speed change ratio.

A reverse clutch 70B is formed adjacent the counter gear 32 mounted on and rotatable relative to the first counter shaft 30. A clutch hub 72B of the clutch 70B is rotatable in unison with the first counter shaft 30. By displacing a hub sleeve 74B to the left from the illustrated neutral position, inner spline teeth of the hub sleeve 74B are brought into mesh with spline teeth 76B of the counter gear 32. The gear speed change system thus attains the reverse speed change ratio.

This embodiment is very similar to the structures shown in FIGS. 2 and 3, and has the arrangement shown in (2) in FIG. 21.

Sixth Embodiment

Figure 6:
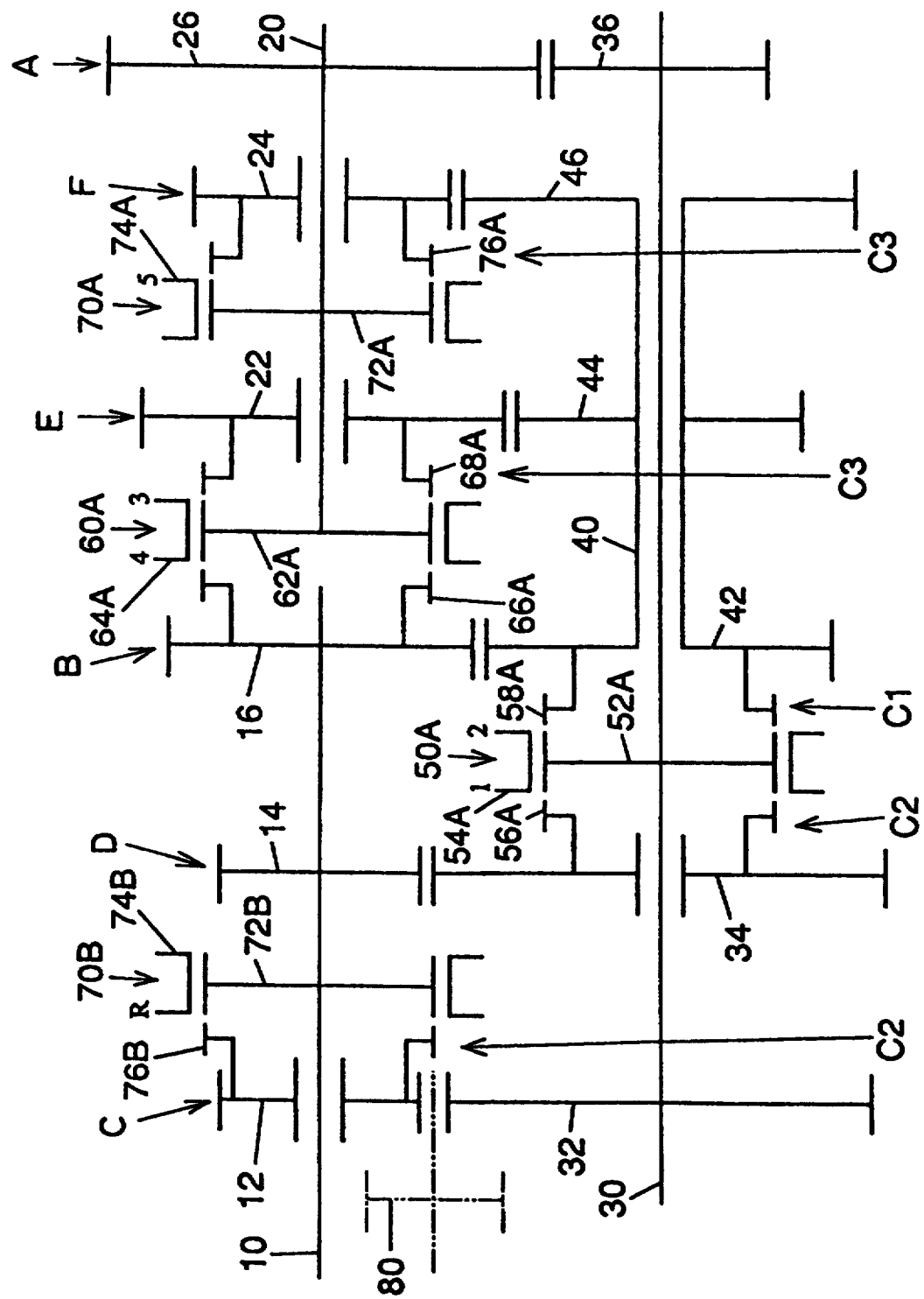
FIG. 6 is a skeleton diagram showing a sixth embodiment of the gear speed change system.

FIG. 6 shows this gear speed change system, which is a modification of the preceding fifth embodiment and has the same structure thereas except that the reverse clutch 70B is formed adjacent the first input gear 12 mounted on and rotatable relative to the input shaft 10. Again this embodiment realizes the arrangement shown in (2) in FIG. 21.

Seventh embodiment

This embodiment corresponds to the arrangement shown in (1) in FIG. 21.

Figure 7:
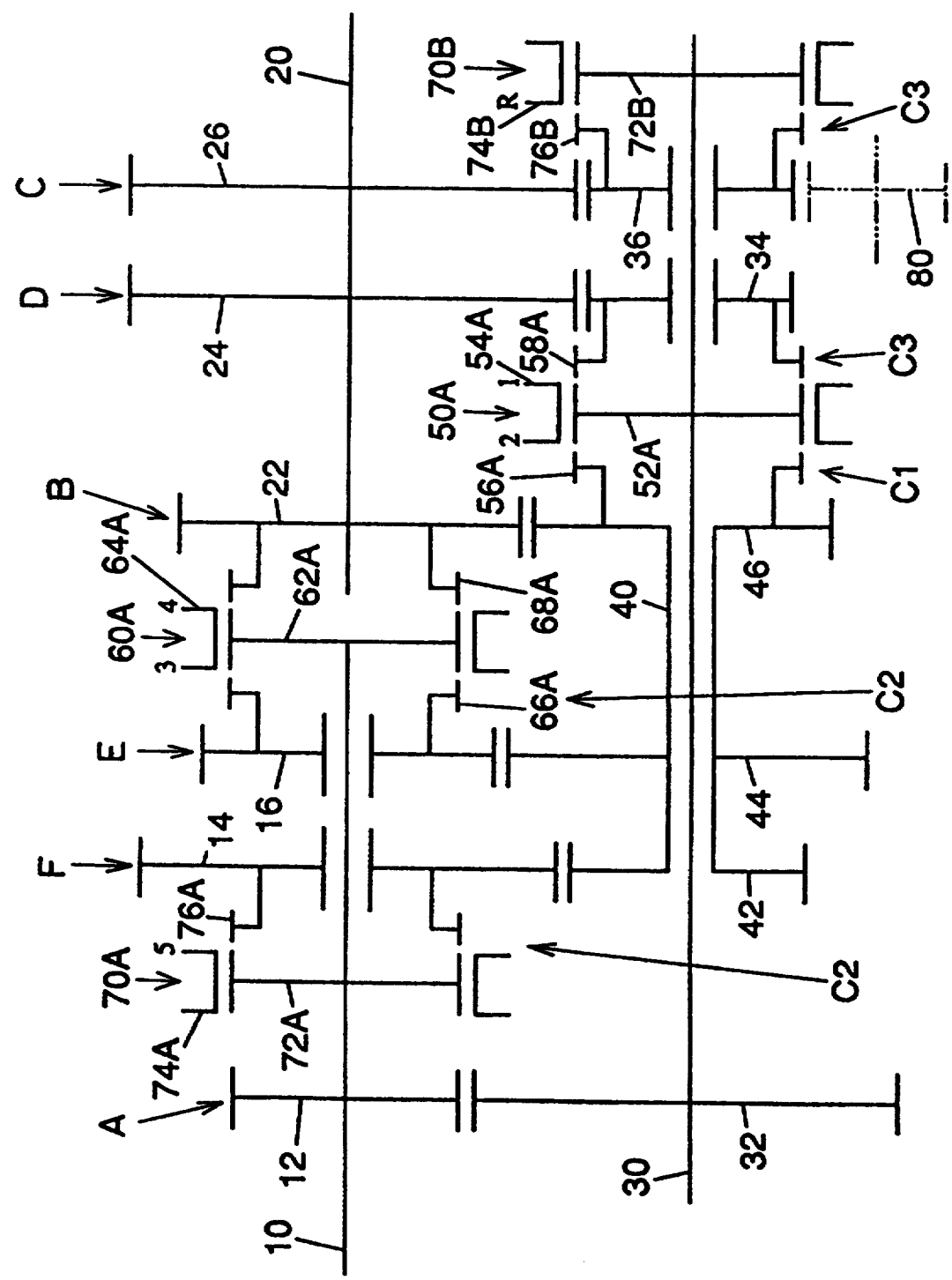
FIG. 7 is a skeleton diagram showing a seventh embodiment of the gear speed change system.

FIG. 7 shows this gear speed change system. The first/second forward clutch 50A is formed between the counter gear 46 mounted on and rotatable in unison with the second counter shaft 40 and the counter gear 34 mounted on and rotatable relative to the first counter shaft 30. The clutch hub 52A of the clutch 50A is rotatable in unison with the first counter shaft 30. By displacing the hub sleeve 54A to the left and right from the illustrated neutral position, inner spline teeth of the hub sleeve 54A are brought into selective mesh with either of spline teeth 56A and 58A of the respective counter gears 46 and 34. The gear speed change system thus attains the first or second forward speed change ratio.

The third/fourth clutch 60A is formed between the third input gear 16 mounted on and rotatable relative to the input shaft 10 and the first output gear 22 mounted on and rotatable in unison with the output shaft 20. The clutch hub 62A of the clutch 60A is rotatable in unison with the input shaft 10. By displacing the hub sleeve 64A to the left and right from the illustrated neutral position, inner spline teeth of the hub sleeve 64A are brought into selective mesh with either of the spline teeth 66A and 68A of the respective third input and first output gears 16 and 22. The gear speed change system thus attains the third forward speed change ratio or the fourth forward speed change ratio by direct coupling of the input and output shafts 10 and 20.

The fifth forward clutch 70A is formed adjacent the second input gear 14 mounted on and rotatable relative to the input shaft 10. The clutch hub 72A of the clutch 70A is rotatable in unison with the input shaft 10. By displacing the hub sleeve 74A to the right from the illustrated neutral position, inner spline teeth of the hub sleeve 74A are brought into mesh with the spline teeth 76A of the second input gear 14. The gear speed change system thus attains the fifth forward speed change ratio.

The reverse clutch 70B is formed adjacent the counter gear 36 mounted on and rotatable relative to the first counter shaft 30. The clutch hub 72B of the clutch 70B is rotatable in unison with the first counter shaft 30. By displacing the hub sleeve 74B to the left from the illustrated neutral postion, inner spline teeth of hub sleeve 74B are brought into mesh with the spline teeth 76B of the counter gear 36. The gear speed change system thus attains the reverse speed change ratio. The above structure realizes the arrangement shown in (1) in FIG. 21. In this case, the clutch C1 for second forward allows and inhibits the relative rotation of the first and second counter shafts 30 and 40.

Eighth Embodiment

Figure 8:
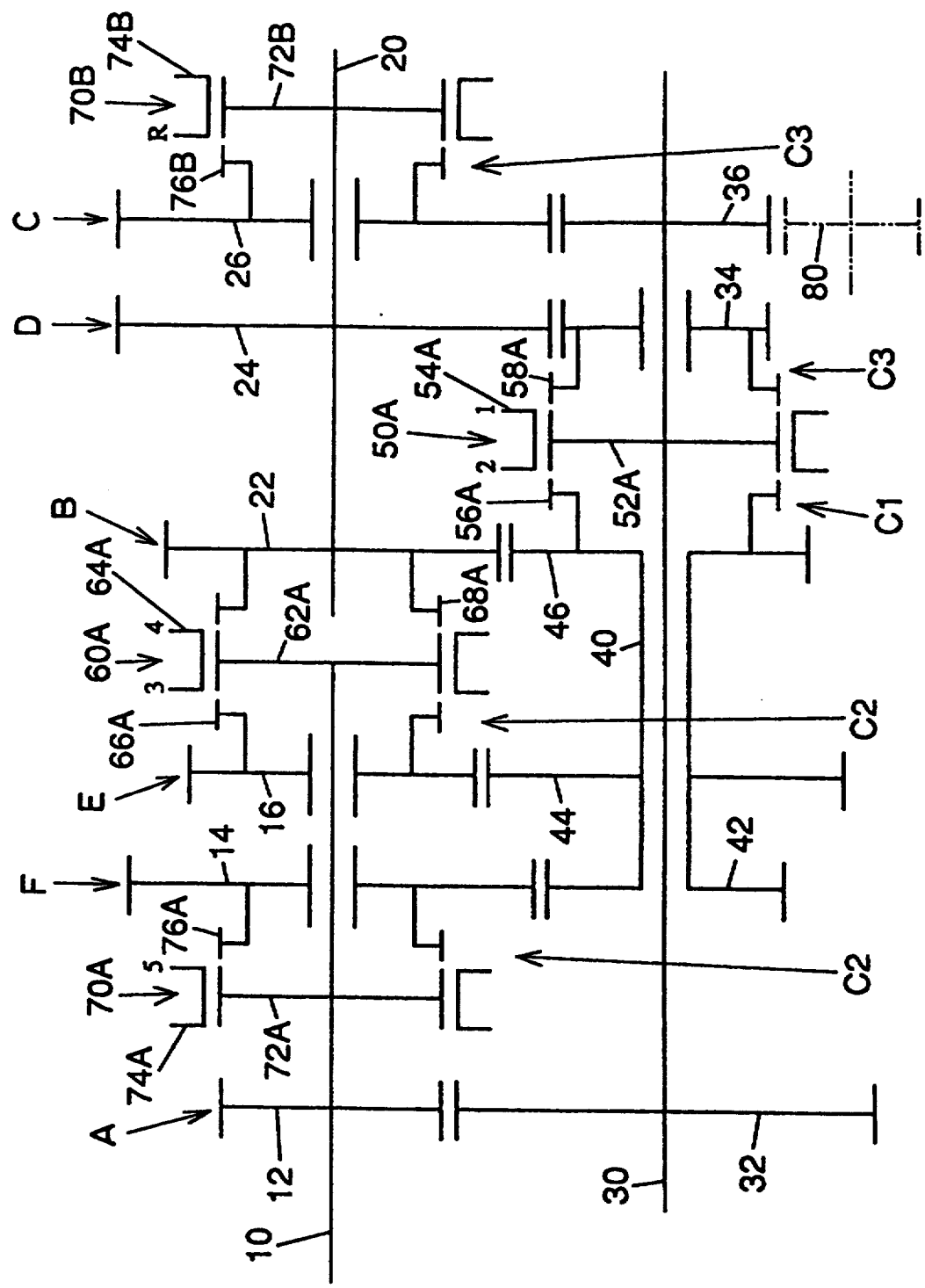
FIG. 8 is a skeleton diagram showing an eighth embodiment of the gear speed change system.

FIG. 8 shows this gear speed change system, which is a modification of the preceding seventh embodiment and has the same structure thereas except that the reverse clutch 70B is formed adjacent the third output gear 26 mounted on and rotatable relative to the output shaft 30.

Ninth Embodiment

This embodiment corresponds to the arrangement shown in (3) in FIG. 21.

Figure 9:
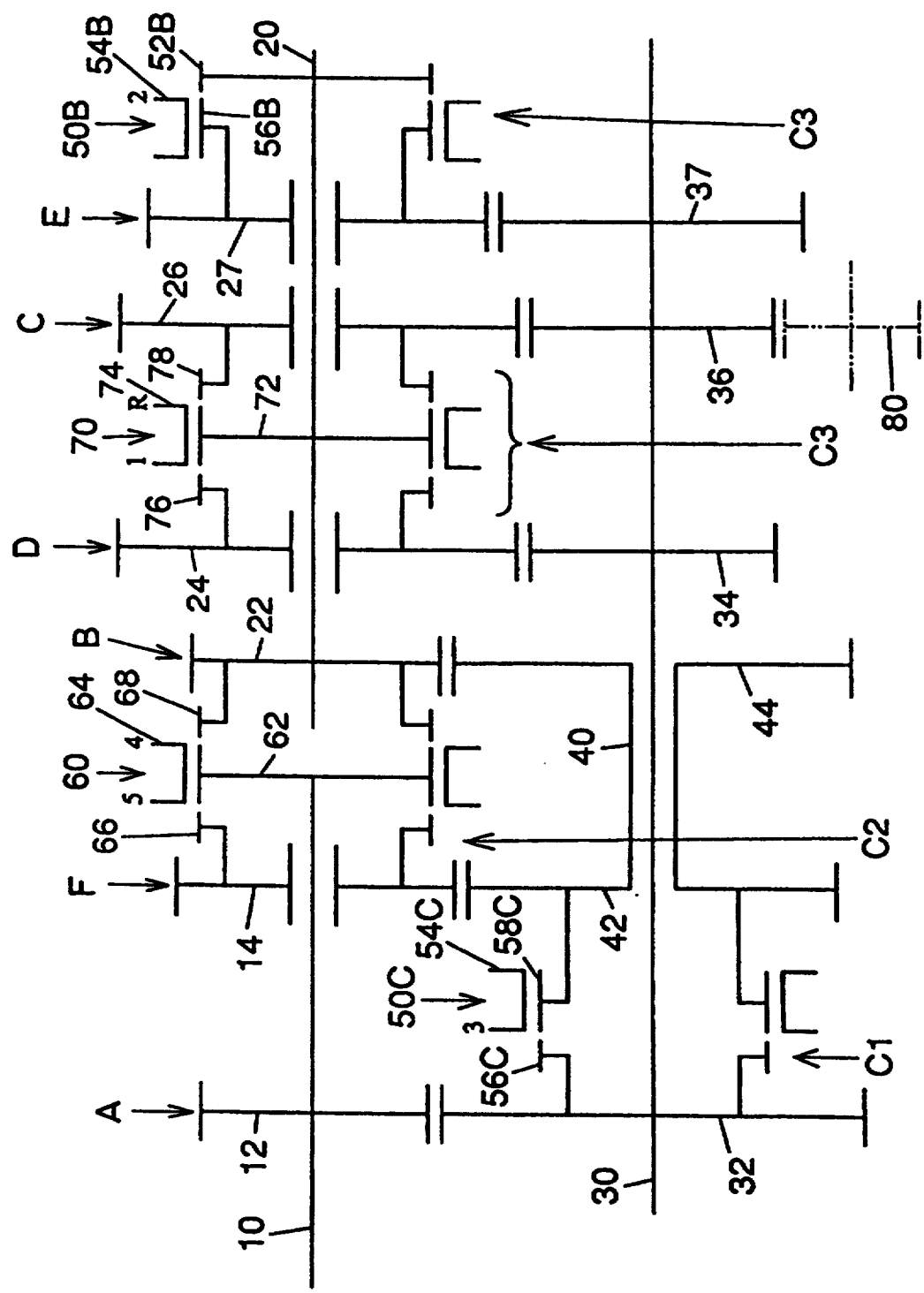
FIG. 9 is a skeleton diagram showing a ninth embodiment of the gear speed change system.

FIG. 9 shows this gear speed change system. In this instance, the second/third forward clutch 50 in the previous first embodiment comprises separate second and third forward clutches 50B and 50C. The second forward clutch 50B is formed adjacent a fourth output gear 27 mounted on and rotatable relative to the output shaft 20. A clutch hub 52B of the clutch 50B is rotatable in unison with the output shaft 20. A hub sleeve 54B of the clutch 50B is in mesh with the fourth output gear 27 in its neutral state. By displacing the hub sleeve 54B to the right from the neutral position, inner spline teeth of the hub sleeve 54B are brought into mesh with the clutch hub 52B. The gear speed change system thus attains the second forward speed change ratio. In this state, torque transmission is possible from the gear set E to the output shaft 20.

A third forward clutch 50C is formed between the counter gear 32 mounted on and rotatable in unison with the first counter shaft 30 and the counter gear 42 mounted on and rotatable in unison with the second counter shaft 40. A hub sleeve 54C of the clutch 50C is in mesh with spline teeth 58C of the counter gear 42 in its neutral state. By displacing the hub sleeve 54C to the left from the neutral position, inner spline teeth of the hub sleeve 54C are brought into mesh with spline teeth 56C of counter gear 32. The gear speed change system thus attains the third forward speed change ratio. In this state, the relative rotation of the first and second counter shafts 30 and 40 is inhibited.

The fourth/fifth forward clutch 60 is formed between the second input gear 14 mounted on and rotatable relative to the input shaft 10 and the first output gear 22 mounted on and rotatable in unison with the output shaft 20. The clutch hub 62 of the clutch 60 is rotatable in unison with the input shaft 10. By displacing the hub sleeve 64 to the left and right from the neutral position, inner spline teeth of the hub sleeve 64 are brought into mesh with either the spline teeth 66 and 68 of the respective second input and first output gears 14 and 22. The gear speed change system thus attains the fifth forward speed change ratio or the fourth forward speed change ratio by direct coupling of the input and output shafts 10 and 20.

The first forward/reverse clutch 70, like that in the first embodiment, is formed between second and third output gears 24 and 26 mounted on and rotatable relative to the output shaft 20. The clutch hub 72 of the clutch 70 is rotatable in unison with the output shaft 20. By displacing the hub sleeve 74 to the left and right from the illustrated neutral position, inner spline teeth of the hub sleeve 74 are brought into selective mesh with either of the spline teeth 76 and 78 of the respective second and third output gears 24 and 26. The gear speed change system thus attains the first forward or reverse speed change ratio.

In this embodiment, the first gear set A is the same as in the first embodiment. Gear sets D, C and E which are formed by the second to fourth output gears 24, 26 and 27 mounted on and rotatable relative to the output shaft 20 and the counter gears 34, 36 and 37 mounted on and rotatable in unison with the first counter shaft 30, are for coupling the first counter and output shafts 30 and 20 to each other. The second counter and output shafts 40 and 20 are coupled to each other at all times by the second gear set B. The second counter and input shafts 40 and 10 can be coupled by the sixth gear set F, which can be coupled and decoupled by the clutch C2. It will be seen that this structure realizes the arrangement shown in (3) in FIG. 21.

Tenth Embodiment

This embodiment realizes the arrangement shown in (4) in FIG. 21.

Figure 10:
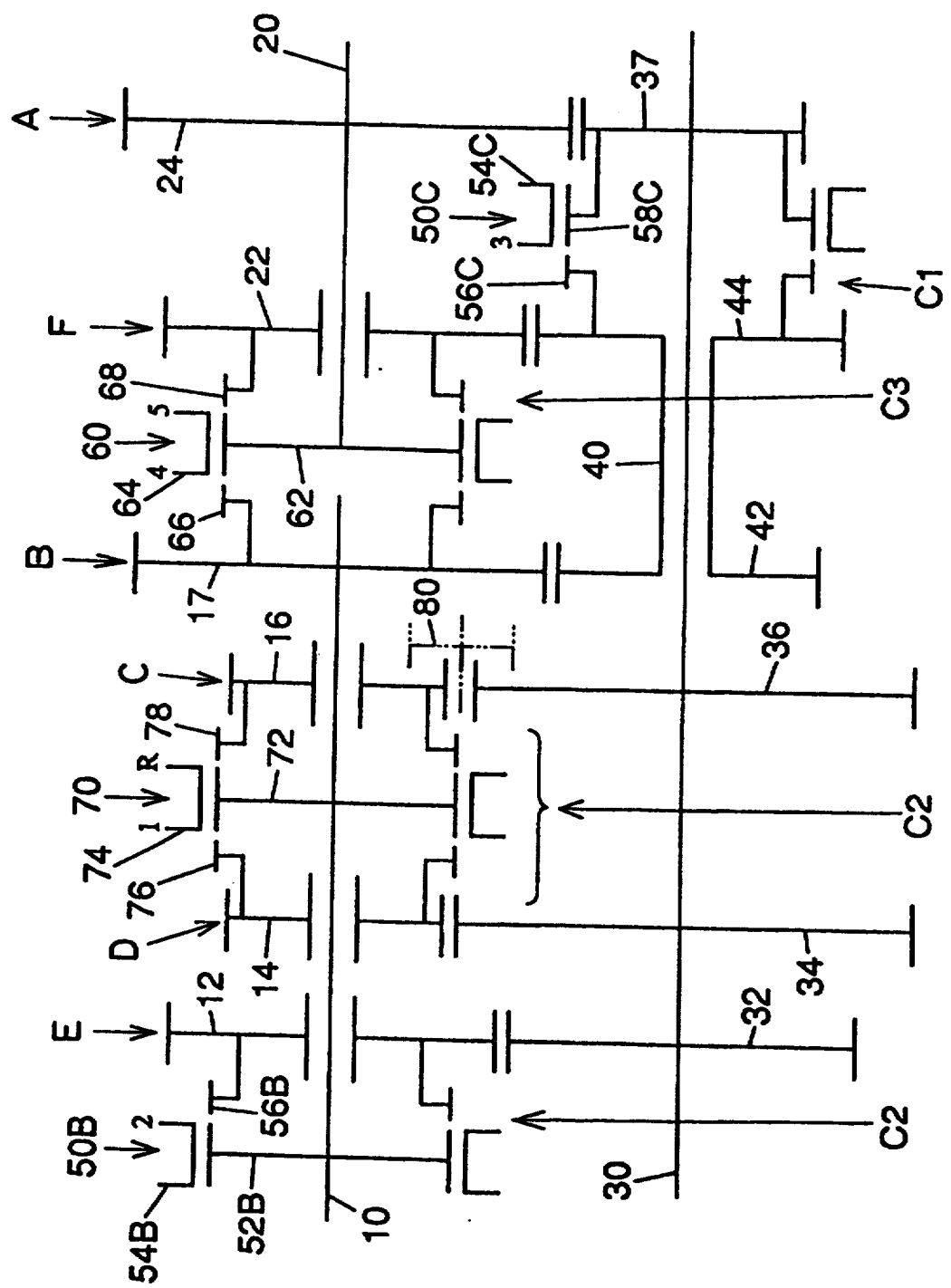
FIG. 10 is a skeleton diagram showing a tenth embodiment of the gear speed change system.

FIG. 10 shows this gear speed change system, which is a modification of the preceding ninth embodiment. The second forward clutch 50B is formed adjacent the first input gear 12 mounted on and rotatable relative to the input shaft 10. The clutch hub 52B of the clutch 50B is rotatable in unison with the input shaft 10. By displacing the hub sleeve 54B to the right from the illustrated neutral position, inner spline teeth of the hub sleeve 54B are brought into mesh with the spline teeth 56B of the first input gear 12. The gear speed change system thus attains the second forward speed change ratio. In this state, gear set E allows torque transmission between the input and first counter shafts 10 and 30.

The third forward clutch 50C is formed between the counter gear 44 mounted on and rotatable in unison with the second counter shaft 40 and the counter gear 37 mounted on and rotatable in unison with the first counter shaft 30. The hub sleeve 54C of the clutch 50C is in mesh with spline teeth 58C of the counter gear 37 in its neutral state. By displacing the hub sleeve 54C to the left from the neutral position, inner spline teeth of the hub sleeve 54C are brought into mesh with the spline teeth 56C of the counter gear 44. The gear speed change system thus attains the third forward speed change ratio. In this state, the relative rotation of the first and second counter shafts 30 and 40 is inhibited.

The fourth/fifth forward clutch 60 is formed between a fourth input gear 17 mounted on and rotatable in unison with the input shaft 10 and the first output gear 22 rotatable relative to the output shaft 20. The clutch hub 62 of the clutch 60 is rotatable in unison with the output shaft 20. By displacing the hub sleeve 64 to the left and right from the illustrated neutral position, inner spline teeth of the hub sleeve 64 are brought into selective mesh with either of the spline teeth 66 and 68 of the respective fourth input and first output gears 17 and 22. The gear speed change system thus attains the fourth forward speed change ratio with direct coupling of the input and output shafts 10 and 20 or the fifth forward speed change ratio.

The first forward/reverse clutch 70 is formed between the second and third input gears 14 and 16 mounted on and rotatable relative to the input shaft 10. The clutch hub 72 of the clutch 70 is rotatable in unison with the input shaft 10. By displacing the hub sleeve 74 to the left and right from the illustrated neutral position, inner spline teeth of the hub sleeve 74 are brought into selective mesh with either of the spline teeth 76 and 78 of the respective second and third input gears 14 and 16. The gear speed change system thus attains the first forward or reverse speed change ratio.

As is obvious from the above, this embodiment corresponds to the arrangement shown in (4) in FIG. 21.

According to the first aspect of the invention, it is possible to provide the arrangement shown in (3a) in FIG. 21, which is a modification of the arrangement shown in (3) in FIG. 21.

Now, an 11th to a 19th embodiment which corresponds to the second aspect of the invention will be described. In these embodiments, parts that are the same as those in the first to tenth embodiments are given like reference numbers, and their description will not be repeated.

11th Embodiment

Figure 22:
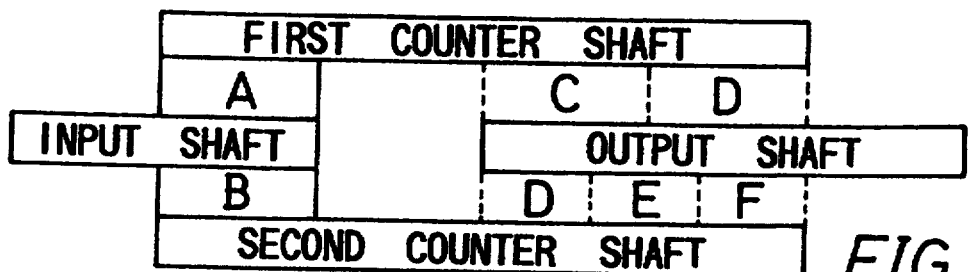
FIG. 22 is a view schematically showing a gear speed change system scheme according to a second aspect of the invention.
Figure 22:
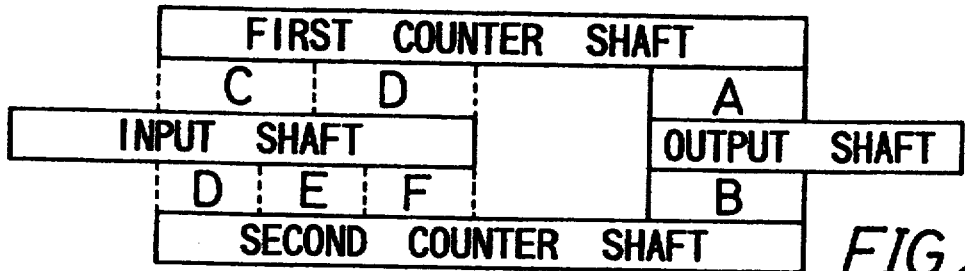
Figure 22:
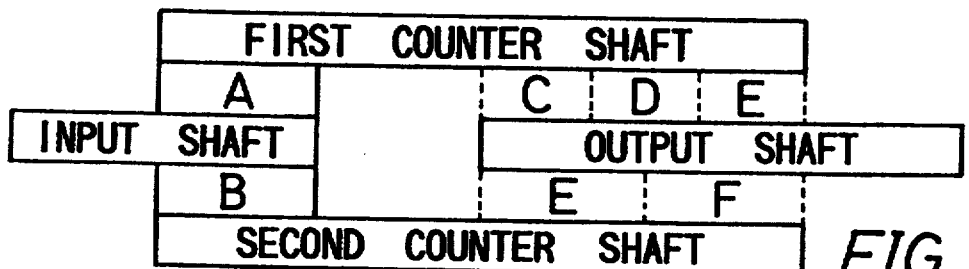
Figure 22:
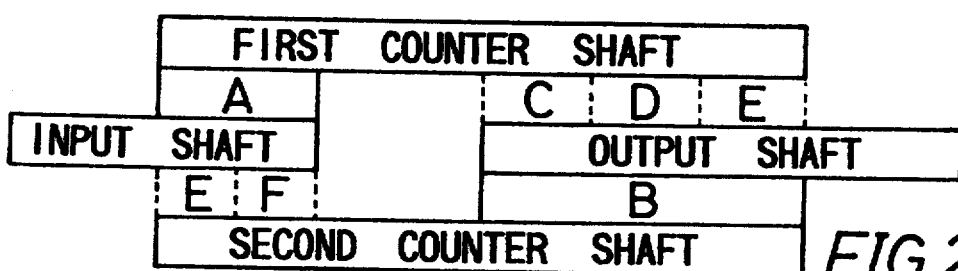
Figure 22:
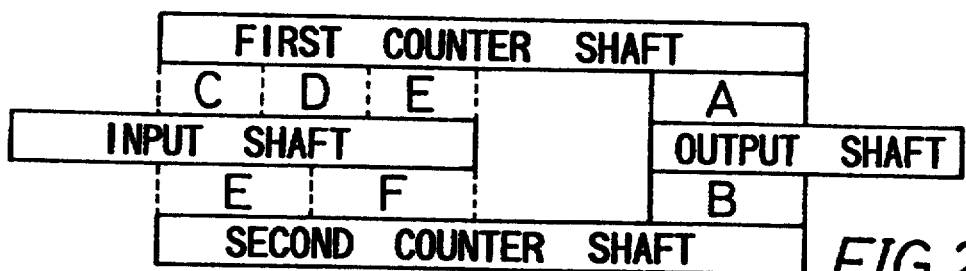
Figure 22:
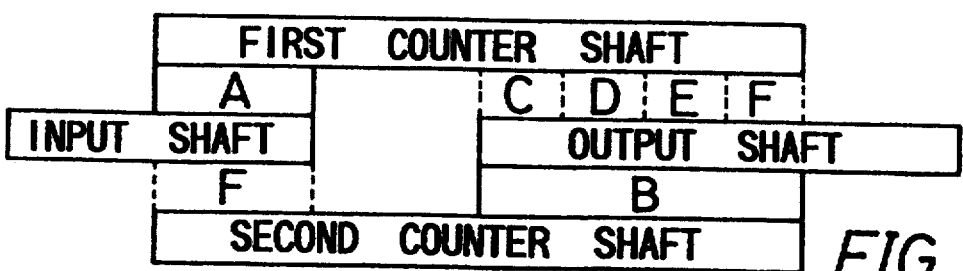

This embodiment realizes the arrangement shown in (1) in FIG. 22.

Figure 11:
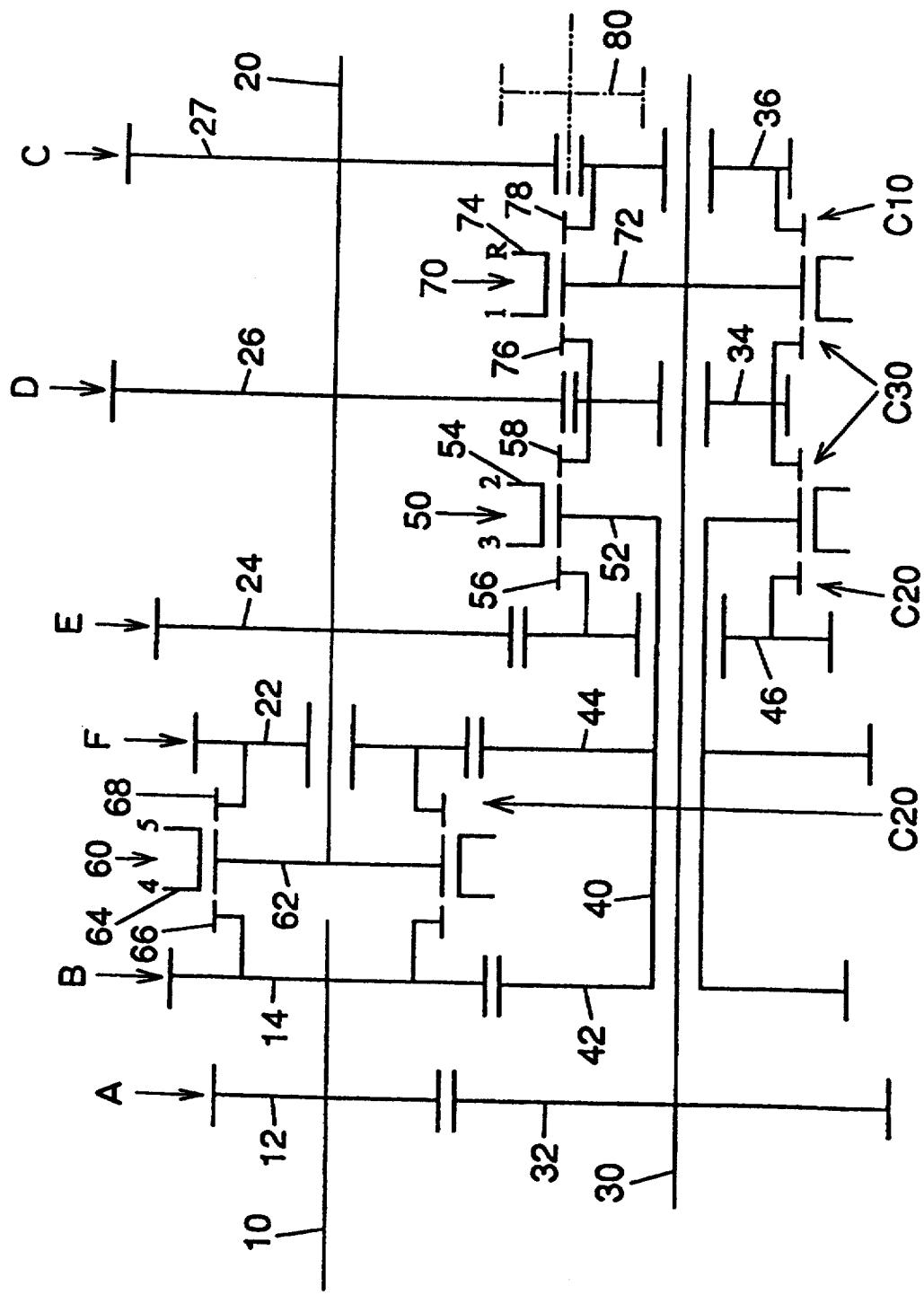
FIG. 11 is a skeleton diagram showing an 11th embodiment of the gear speed change system.

FIG. 11 shows this gear speed change system. The second/third forward clutch 50 is formed between the counter gears 46 and 34 mounted on and rotatable relative to the respective second and first counter shafts 40 and 30. The clutch hub 52 of the clutch 50 is rotatable in unison with the second counter shaft 40. By displacing the hub sleeve 54 to the left and right from the illustrated neutral position, inner spline teeth of the hub sleeve 54 are brought into selective mesh with either the spline teeth 56 and 58 of the respective counter gears 46 and 34. The gear speed change system thus attains the second or third forward speed change ratio.

The fourth/fifth forward clutch 60 is formed between the second input gear 14 mounted on and rotatable in unison with the input shaft 10 and the first output gear 22 mounted on and rotatable relative to the output shaft 20. The clutch hub 62 of the clutch 60 is rotatable in unison with the output shaft 20. By displacing the hub sleeve 64 to the left and right from the illustrated neutral position, inner spline teeth of the hub sleeve 64 are brought into selective mesh with either of the spline teeth 66 and 68 of the respective second input and first output gears 14 and 22. The gear speed change system thus attains the fourth forward speed change ratio with direct coupling of the input and output shafts 10 and 20 or the fifth forward speed change reduction ratio.

The first forward/reverse clutch 70 is formed between the counter gears 34 and 36 mounted on and rotatable relative to the first counter shaft 30. The clutch hub 72 of the clutch 70 is rotatable in unison with the first counter shaft 30. BY displacing the hub sleeve 74 to the left and right from the illustrated neutral position, inner spline teeth of the hub sleeve 74 are brought into selective mesh with either of the spline teeth 76 and 78 of the respective counter gears 34 and 36. The gear speed change system thus attains the first forward or reverse speed change ratio.

In this embodiment, the first counter shaft 30 is coupled at all times to the input shaft 10 via the gear set A and can be coupled to the output shaft 20 via the gear set C or D. The second counter shaft 40 is coupled at all times to the input shaft 10 via the gear set B and can be coupled to the output shaft 20 via the gear sets F, E or D. Either of the gear sets C and D with respect to the output shaft 20 (from the first counter shaft 30) and either of the gear sets D to F with respect to the output shaft 20 (from the second counter shaft 40) can be clutched for torque transmission. That is, the gear set D can be used in both the cases from the respective first and second counter shafts 30 and 40. In other words, it is possible to attain the speed change ratio with the gear sets A and D and that with the gear sets B and D.

As is obvious from the above, this embodiment realizes the arrangement shown in (1) in FIG. 22. Since the gear set D is a common gear set, the number of gear sets is reduced.

In this case, the clutch 70 serves as a first clutch between the first counter and output shafts, while the clutches 60 and 50 serve as a second clutch between the second counter and output shafts 40 and 20.

12th Embodiment

Figure 12:
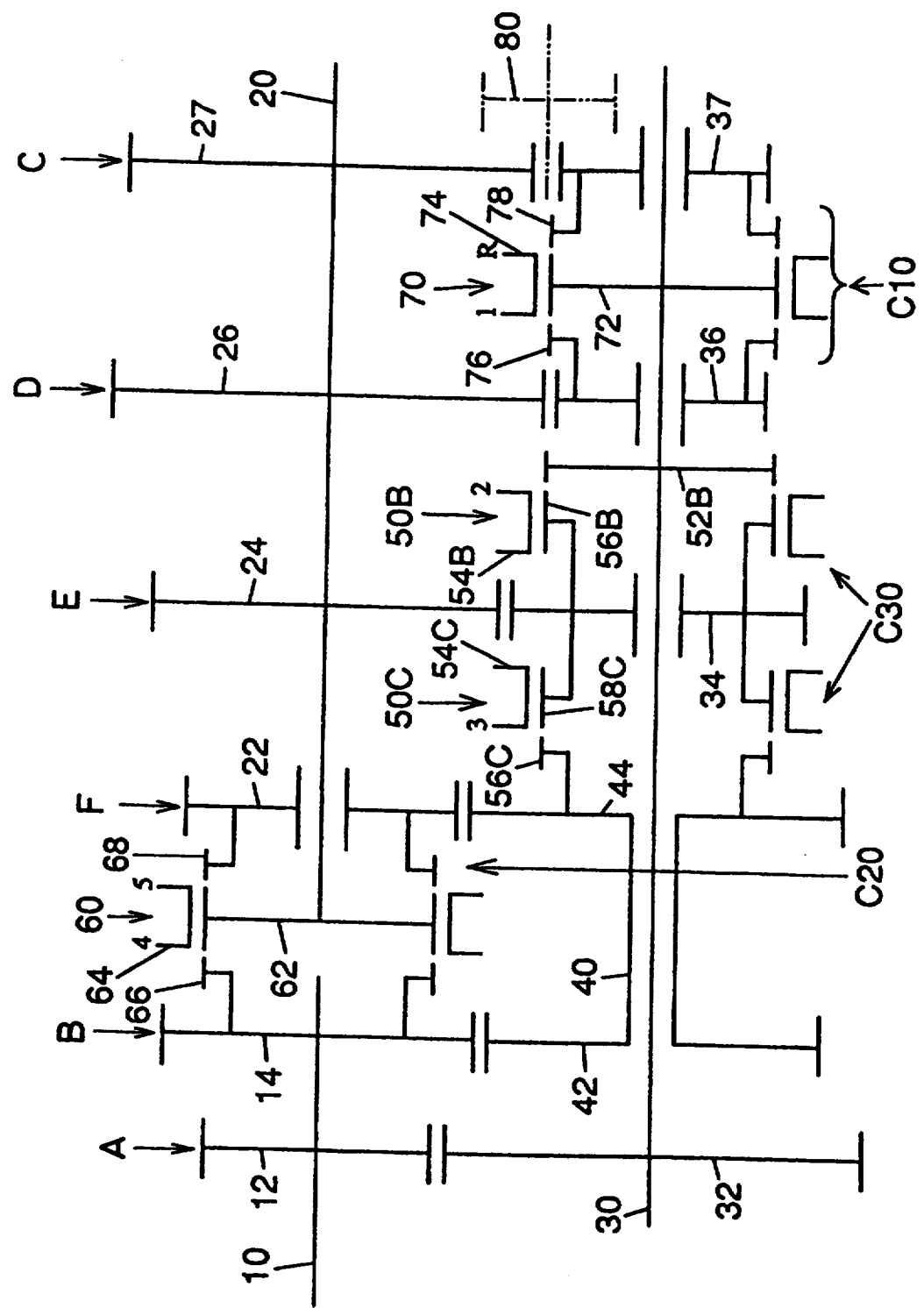
FIG. 12 is a skeleton diagram showing a 12th embodiment of the gear speed change system.

FIG. 12 shows this gear speed change system. In this case, the second/third forward clutch 50 in the preceding 11th embodiment comprises separate second forward and third forward clutches 50B and 50C. The second forward clutch 50B is formed adjacent the counter gear 34 mounted on and rotatable relative to the first counter shaft 30. The clutch hub 52B of the clutch 50B is rotatable in unison with the first counter shaft 30. The hub sleeve 54B of the clutch 52B is in mesh with the spline teeth 56B of the counter gear 34 in its neutral state. By displacing the hub sleeve 54B to the right from the neutral position, inner spline teeth of the hub sleeve 54B are brought into mesh with the clutch hub 52B. The gear speed change system thus attains the second forward speed change ratio.

The third forward clutch 50C, on the other hand, is formed between the counter gears 44 and 34, the former being mounted on and rotatable in unison with the second counter shaft 40 and the latter being mounted on and rotatable relative to the first counter shaft 30. The clutch hub 54C of the clutch 50C is in mesh with spline teeth 58C of the counter gear 34 in its neutral state. By displacing the hub sleeve 54C to the left from the neutral position, inner spline teeth of the hub sleeve 54C are brought into mesh with spline teeth 56C of the counter gear 44. The gear speed change system thus attains the third forward speed change ratio.

The fourth/fifth forward clutch 60 is formed between the second input gear 14 mounted on and rotatable in unison with the input shaft 10 and the first output gear 22 mounted on and rotatable relative to the output shaft 20. The clutch hub 62 of the clutch 60 is rotatable in unison with the output shaft 20. By displacing the hub sleeve 64 to the left and right from the illustrated neutral position, inner spline teeth of the hub sleeve 64 are brought into selective mesh with either of spline teeth 66 and 68 of the second and first output gears 14 and 22. The gear speed change system thus attains either the fourth speed change ratio with direct coupling of the input and output shafts 10 and 20 or the fifth forward speed change ratio.

The first forward/reverse clutch 70 is formed between the counter gears 36 and 37 mounted on and rotatable relative to the first counter shaft 30. The clutch hub 72 of the clutch 70 is rotatable in unison with the first counter shaft 30. By displacing the hub sleeve 74 to the left and right from the illustrated neutral position, inner spline teeth of the hub sleeve 74 are brought into selective mesh with either of spline teeth 76 and 78 of the counter gears 36 and 37. The gear speed change system thus attains the first forward or reverse speed change ratio.

This embodiment realizes the arrangement shown in (3) in FIG. 22. In this case, the gear set E is used commonly to couple the first counter and output shafts 30 and 20 and to couple the second counter and output shafts 40 and 20.

13th Embodiment

Figure 13:
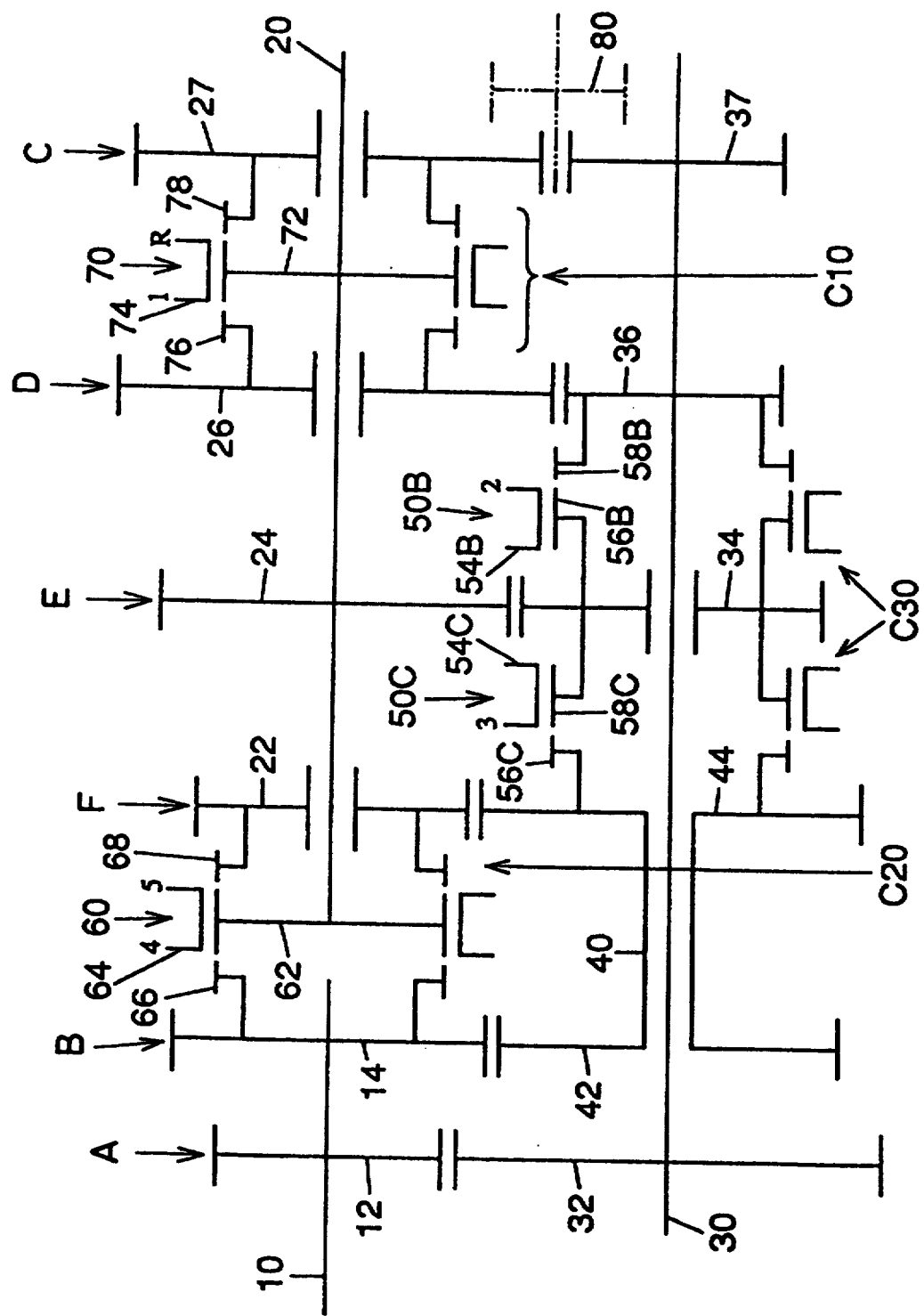
FIG. 13 is a skeleton diagram showing a 13th embodiment of the gear speed change system.

FIG. 13 shows this gear speed change system, which is a modification of the preceding 12th embodiment and has the same structure thereas except the following structure.

In this embodiment, the second forward clutch 50B is formed between the counter gears 34 and 36 mounted on and rotatable relative to and in unison with, respectively, the first counter shaft 30. This clutch 50B has no clutch hub, and its hub sleeve 54B is in mesh with the spline teeth 56B of the counter gear 34 in the neutral state. By displacing the hub sleeve 54B to the right from the neutral position, inner spline teeth of the hub sleeve 54B are brought into mesh with the spline teeth 58B of the counter gear 36, thus attaining the second forward speed change ratio. The first forward/reverse clutch 70 is formed between the third and fourth output gears 26 and 27 mounted on and rotatable relative to the output shaft 20.

14th Embodiment

Figure 14:
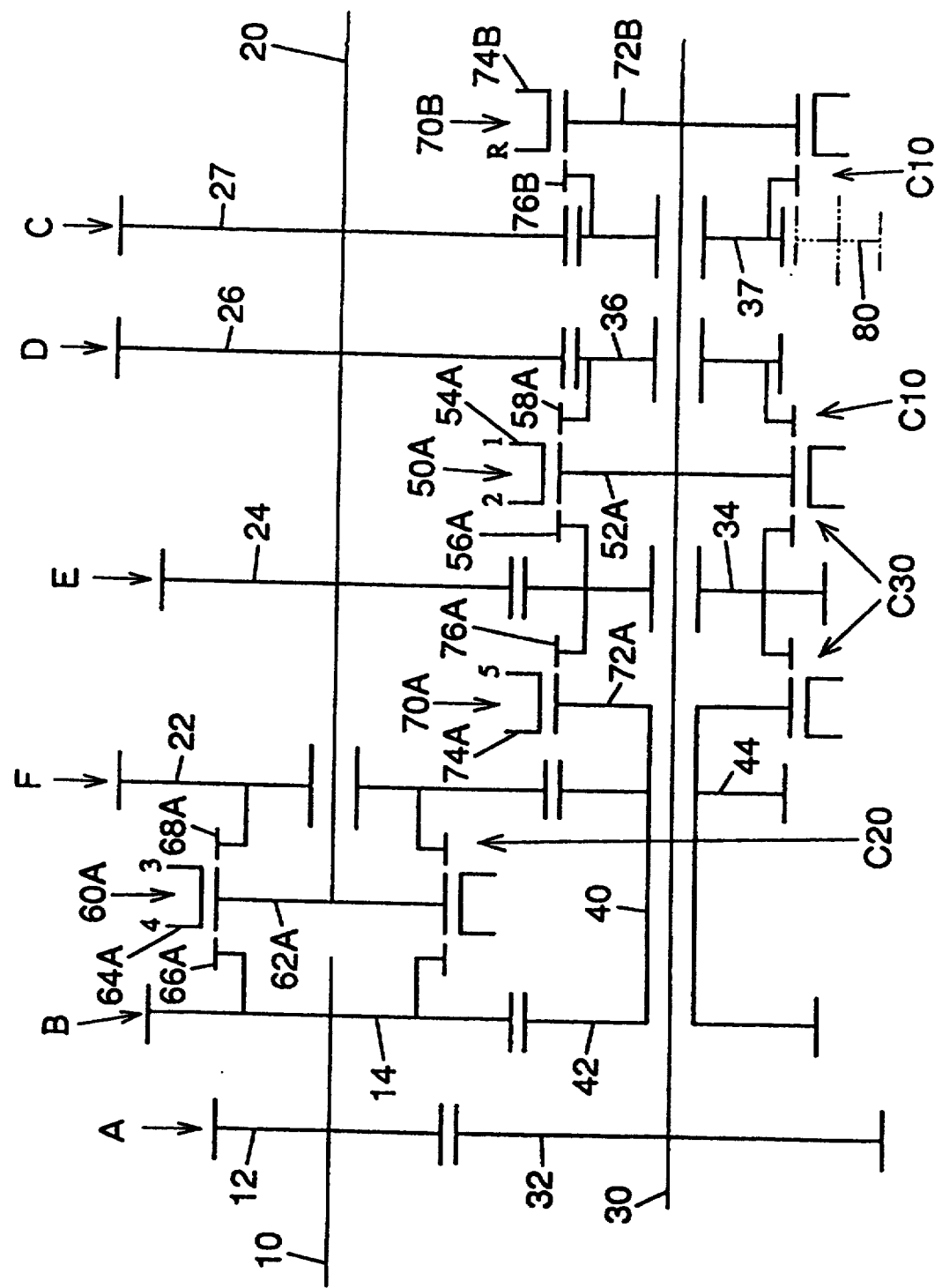
FIG. 14 is a skeleton diagram showing a 14th embodiment of the gear speed change system.

FIG. 14 shows this gear speed change system. The first/second forward clutch 50A is formed between counter gears 34 and 36 mounted on and rotatable relative to the first counter shaft 30. The clutch hub 52A of the clutch 50A is rotatable in unison with the first counter shaft 30. By displacing the hub sleeve 54A to the left and right from the illustrated neutral position, inner spline teeth of the hub sleeve 54A are brought into selective mesh with either of the spline teeth 56A and 58A of the counter gears 34 and 36. The gear speed change system thus attains the first or second forward speed change ratio.

The third/fourth forward clutch 60A is formed between the second input gear 14 mounted on and rotatable in unison with the input shaft 10 and the first output gear 22 mounted on and rotatable relative to the output shaft 20. The clutch hub 62A of the clutch 60A is rotatable in unison with the output shaft 20. By displacing the hub sleeve 64A to the left and right from the illustrated neutral position, inner spline teeth of the hub sleeve 64A are brought into selective mesh with either of the spline teeth 66A and 68A of the respective second input and first output gears 14 and 22. The gear speed change system thus attains the fourth forward speed change ratio with direct coupling of the input and output shafts 10 and 20 or the third forward speed change ratio.

The fifth forward clutch 70A is formed adjacent the counter gear 34 mounted on and rotatable relative to the first counter shaft 30. The clutch hub 72A of the clutch 70A is rotatable in unison with the second counter shaft 40. By displacing the hub sleeve 74A to the right from the illustrated neutral position, inner spline teeth of the hub sleeve 74A are brought into mesh with the spline teeth 76A of the counter gear 34. The gear speed change system thus attains the fifth forward speed change ratio.

The reverse clutch 70B is formed adjacent the counter gear 37 mounted on and rotatable relative to the first counter shaft 30. The clutch hub 72B of the clutch 70B is rotatable in unison with the first counter shaft 30. By displacing the hub sleeve 74B to the left from the illustrated neutral position, inner spline teeth of the hub sleeve 74B are brought into mesh with the spline teeth 76B of the counter gear 37. The gear speed change system thus attains the reverse speed change ratio.

This embodiment realizes the arrangement shown in (3) in FIG. 22.

15th Embodiment

Figure 15:
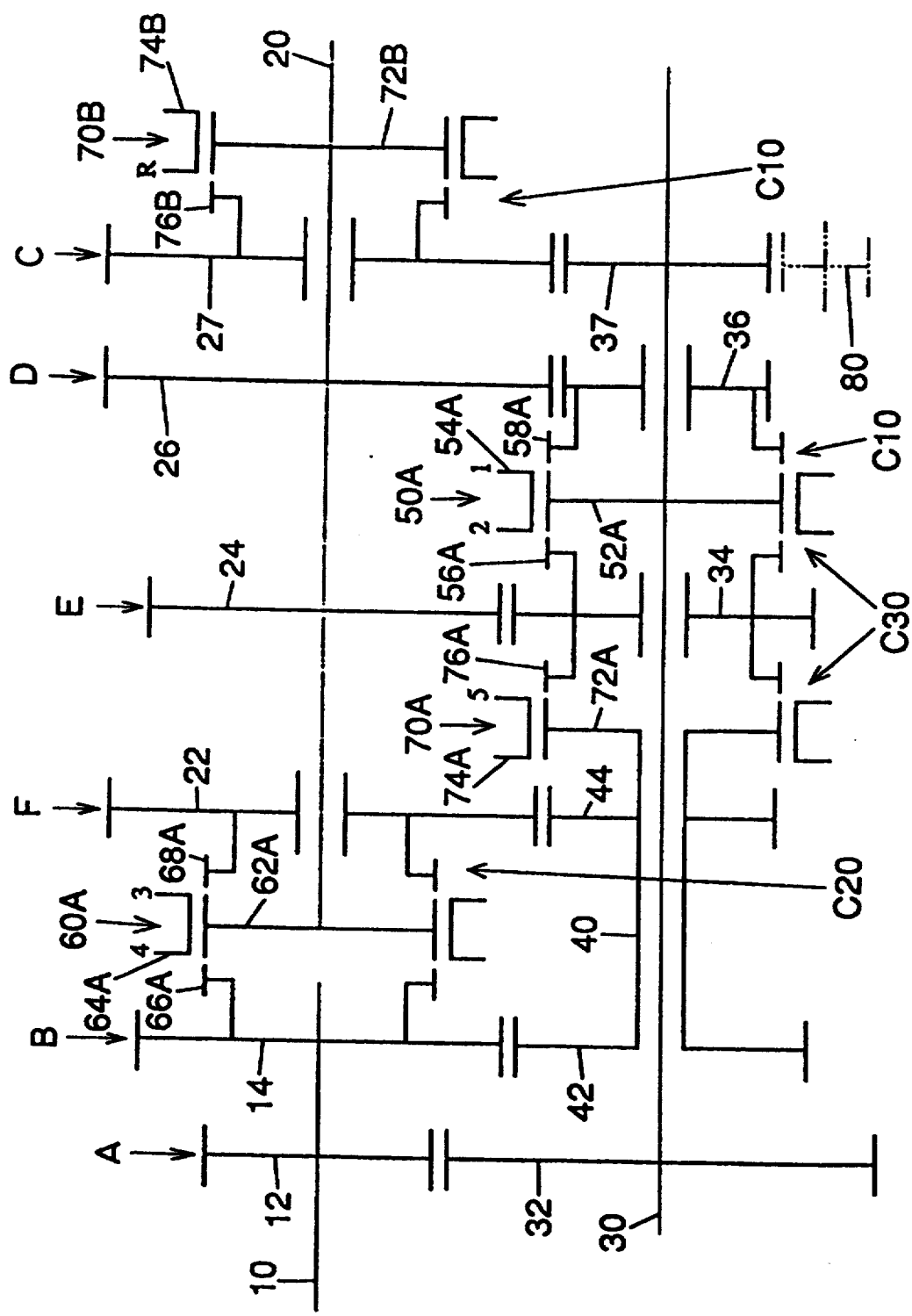
FIG. 15 is a skeleton diagram showing a 15th embodiment of the gear speed change system

FIG. 15 shows this gear speed change system which is a modification of the preceding 14th embodiment and which has the same structure thereas except that the reverse clutch 70B is formed adjacent the fourth output gear 27 mounted on and rotatable relative to the output shaft 20.

This embodiment realizes the arrangement shown in (3) in FIG. 22.

16th Embodiment

Figure 16:
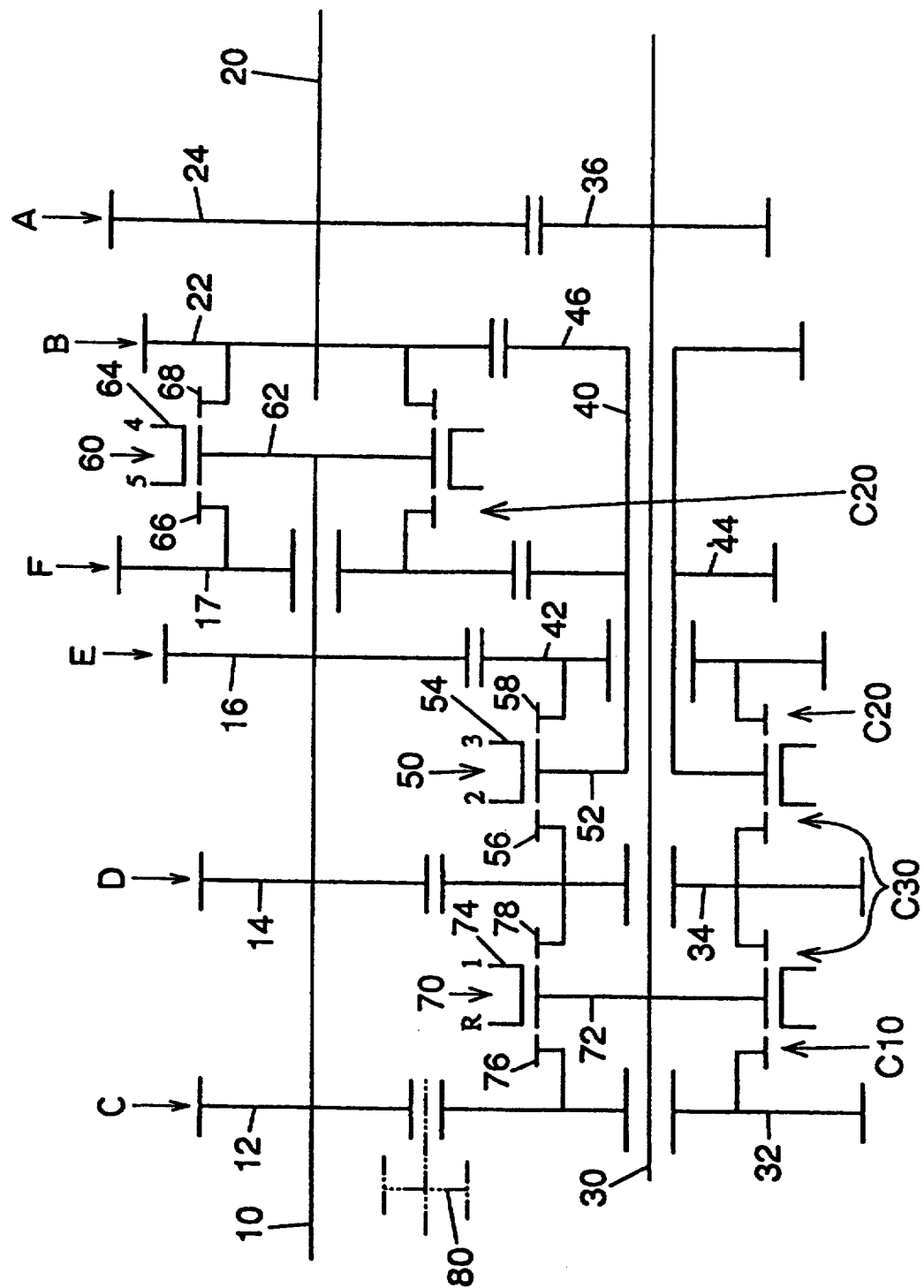
FIG. 16 is a skeleton diagram showing a 16th embodiment of the gear speed change system

FIG. 16 shows this gear speed change system. The second/third forward clutch 50 is formed between the counter gears 34 and 42 mounted on and rotatable relative to the respective first and second counter shafts 30 and 40. The clutch hub 52 of the clutch 50 is rotatable in unison with second counter shaft 40. By displacing the hub sleeve 54 to the left and right from the illustrated neutral position, inner spline teeth of the hub sleeve 54 are brought into selective mesh with either of the spline teeth 56 and 58 of the respective counter gears 34 and 42. The gear speed change system thus attains the second or third forward speed change ratio.

The fourth/fifth the clutch 60 is formed between the fourth input gear 17 mounted on and rotatable relative to the input shaft 10 and the first output gear 22 mounted on and rotatable in unison with the output shaft 20. The clutch hub 62 of the clutch 60 is rotatable in unison with the input shaft 10. By displacing the hub sleeve 64 to the left and right from the illustrated neutral position, inner spline teeth of the hub sleeve 64 are brought into selective mesh with the spline teeth 66 and 68 of the respective fourth input and first output gears 17 and 22. The gear speed change system thus attains the fifth forward speed change ratio or the fourth speed change ratio with direct coupling of the input and output shafts 10 and 20.

The first forward/reverse clutch 70 is formed between the counter gears 32 and 34 mounted on and rotatable relative to the first counter shaft 30. The clutch hub 72 of the clutch 70 is rotatable in unison with the first counter shaft 30. By displacing the hub sleeve 74 to the left and right from the illustrated neutral position, inner spline teeth of the hub sleeve 74 are brought into selective mesh with either of the spline teeth 76 and 78 of the respective counter gears 32 and 34. The gear speed change system thus attains the reverse or first forward speed change ratio.

This embodiment realizes the arrangement shown in (2) in FIG. 22. The gear set D is common to the first and second counter shafts 30 and 40 for torque transmission.

17th Embodiment

This embodiment realizes the arrangement shown in (4) FIG. 22.

Figure 17:
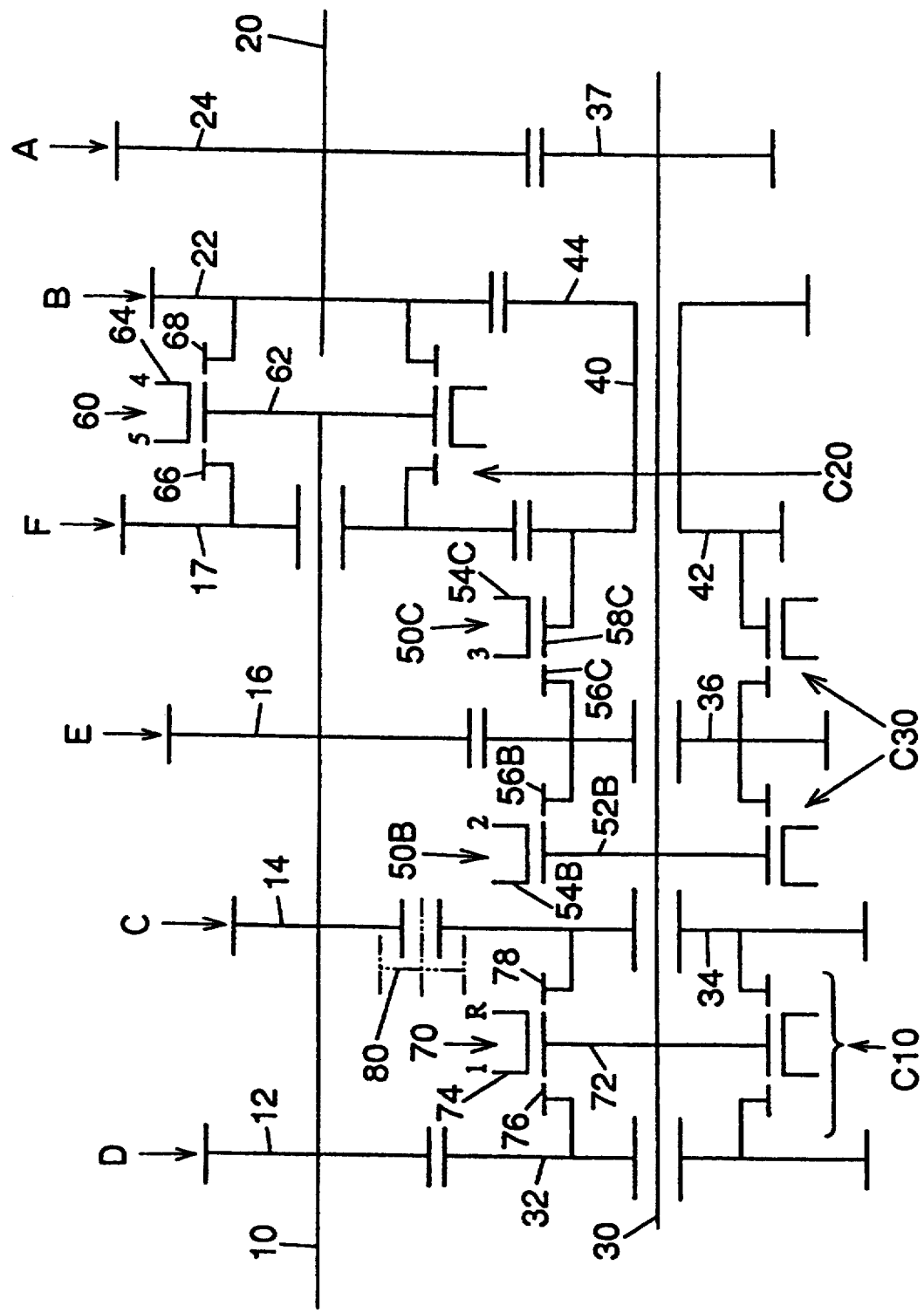
FIG. 17 is a skeleton diagram showing a 17th embodiment of the gear speed change system

FIG. 17 shows this gear speed change system, which has the same structure as the preceding 16th embodiment except that the second/third forward clutch 50 comprises separate second and third forward clutches 50B and 50C. In this embodiment, the gear set E is formed by the third input gear 16 mounted on and rotatable in unison with the input shaft 10 and the counter gear 36 mounted on and rotatable relative to the first counter shaft 30.

The second forward clutch 50B is formed adjacent the left side of the counter gear 36. The clutch hub 52B of the clutch 50B is rotatable in unison with the first counter shaft 30. By displacing the hub sleeve 54B to the right from the illustrated neutral position, inner spline teeth of the hub sleeve 54B are brought into mesh with the spline teeth 56B of the counter gear 36. The gear speed change system thus attains the second forward speed change ratio.

The third forward clutch 50C is formed between the counter gear 36 noted above and the counter gear 42 mounted on and rotatable in unison with the second counter shaft 40. The hub sleeve 54C of the clutch 50C is in mesh with the spline teeth 58C of the counter gear 42 in the neutral state. By displacing the hub sleeve 54C to the left from the neutral position, inner spline teeth of the hub sleeve 54C are brought into mesh with the spline teeth 56C of the counter gear 36. The gear speed change system thus attains the third forward speed change ratio. This embodiment corresponds to the arrangement shown in (4) in FIG. 22.

18th Embodiment

This embodiment realizes the arrangement shown in (4) in FIG. 22.

Figure 18:
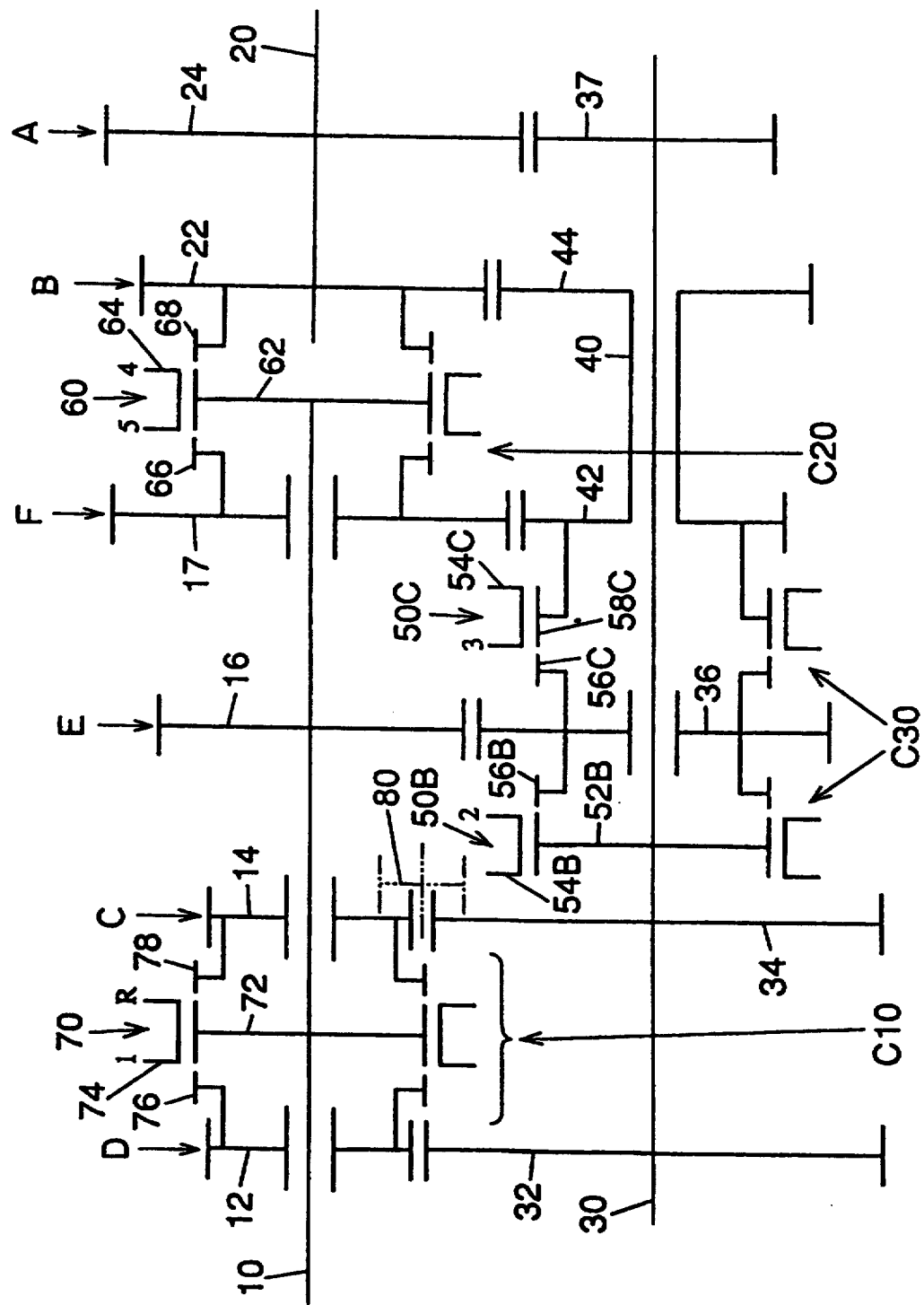
FIG. 18 is a skeleton diagram showing an 18th embodiment of the gear speed change system

FIG. 18 shows this gear speed change system, which is a modification of the preceding 17th embodiment and has the same structure thereas except that the first forward/reverse clutch 70 is formed between the first and second input gears 12 and 14 mounted on and rotatable relative to the input shaft 10.

19th Embodiment

This embodiment again realizes the arrangement shown in (4) in FIG. 22.

Figure 19:
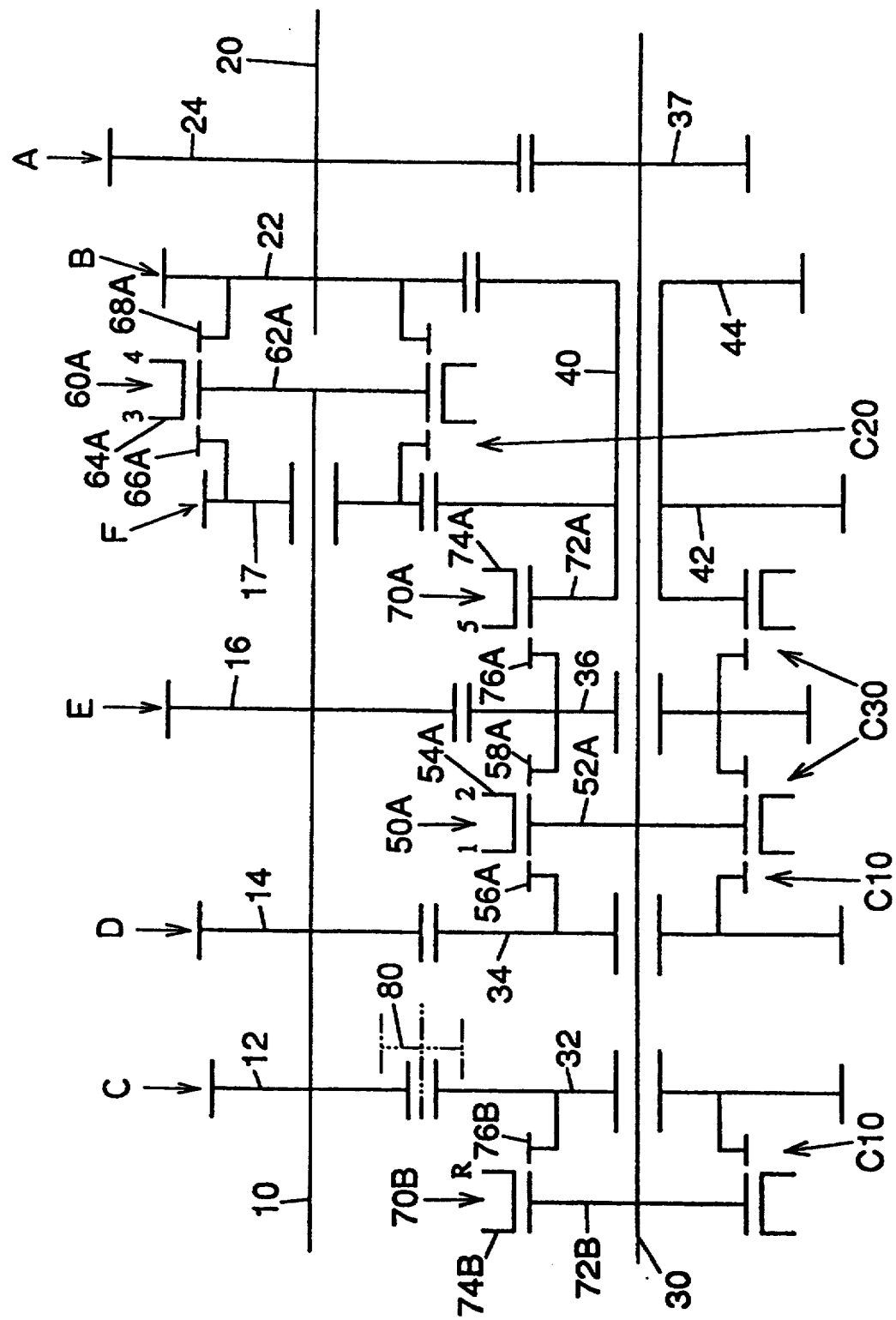
FIG. 19 is a skeleton diagram showing a 19th embodiment of the gear speed change system.
Figure 20A:
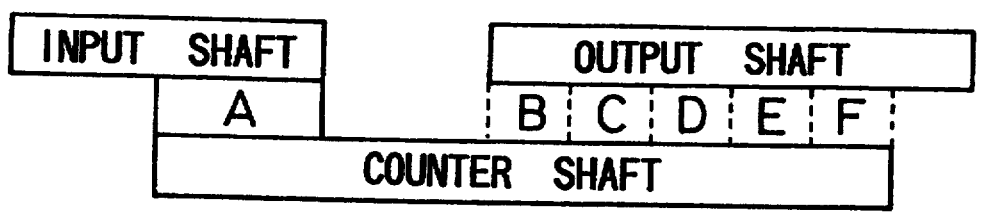
FIG. 20 is a view schematically showing a prior art gear speed change system.
Figure 20B:
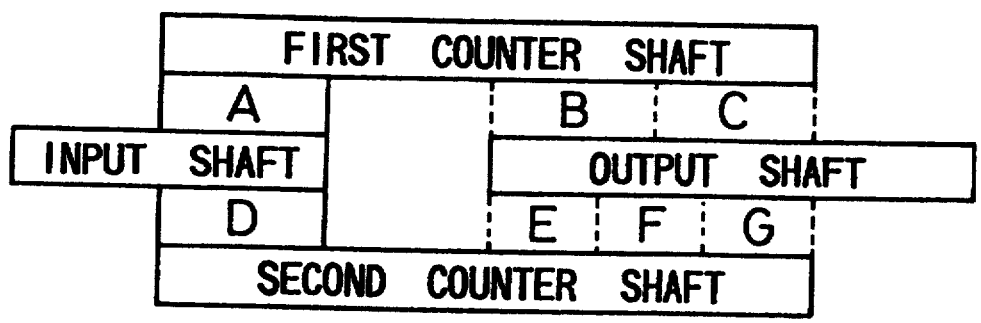

FIG. 19 shows this gear speed change system. The first/second forward clutch 50A is formed between counter gears 34 and 36 mounted on and rotatable relative to the first counter shaft 30. The clutch hub 52A of the clutch 50A is rotatable in unison with the first counter shaft 30. By displacing the hub sleeve 54A to the left and right from the illustrated neutral position, inner spline teeth of the hub sleeve 54A are brought into selective mesh with either of the spline teeth 56A and 58A of the respective counter gears 34 and 36. The gear speed change system thus attains the first or second forward speed change ratio.

The third/fourth forward clutch 60A is formed between the fourth input gear 17 mounted on and rotatable relative to the input shaft 10 and the first output gear 22 mounted on and rotatable in unison with the output shaft 20. The clutch hub 62A of the clutch 60A is rotatable in unison with the input shaft 10. By displacing the hub sleeve 64A to the left and right from the illustrated neutral position, inner spline teeth of the hub sleeve 64A are brought into selective mesh with either of the spline teeth 66A and 68A of the respective fourth input and first output gears 17 and 22. The gear speed change system thus attains the third forward speed change ratio or the fourth forward speed change ratio with direct coupling of the input and output shafts 10 and 20.

Further, the fifth forward clutch 70A is formed adjacent the counter gear 36 mounted on and rotatable relative to the first counter shaft 30. The clutch hub 72A of the clutch 70A is rotatable in unison with the second counter shaft 40. By displacing the hub sleeve 74A to the left from the illustrated neutral position, inner spline teeth of the hub sleeve 74A are brought into mesh with the spline teeth 76A of the counter gear 36. The gear speed change system thus attains the fifth forward speed change ratio.

The reverse clutch 70B is formed adjacent the counter gear 32 mounted on and rotatable relative to the first counter shaft 30. The clutch hub 72B of the clutch 70B is rotatable in unison with the first counter shaft 30. By displacing the hub sleeve 74B to the right from the illustrated neutral position, inner spline teeth of the hub sleeve 74B are brought into mesh with the spline teeth 76B of the counter gear 32. The gear speed change system thus attains the reverse speed change ratio. In this way, the arrangement shown in (4) in FIG. 22 is realized.

The second aspect of the invention covers the arrangements shown in (3a) and (5) in FIG. 22 as well.

As has been described in the foregoing, according to the invention it is possible to attain a power transmission system having different input and output gear sets or have one gear set serve as a common power transmission gear set to two speed change systems. Thus, it is possible to increase the freedom of selection of speed change ratios without increasing the number of gear sets in the overall gear speed change system, that is, while avoiding increase of the size and weight of the speed change system.

What is claimed is:

1. A gear speed change system comprising an input shaft, an output shaft coaxial therewith, a first counter shaft disposed parallel to said input and output shafts, and a second counter shaft coaxial with said first counter shaft;
   one of said first and second counter shafts and said input shaft being coupled to each other at all times by a gear set having gears respectively rotatable in unison with said one counter shaft and said input shaft and meshing with one another;
   the other one of said first and second counter shafts and said output shaft being coupled to each other at all times by a gear set having gears respectively rotatable in unison with said other counter shaft and said output shaft and meshing with one another;
   said one counter shaft coupled at all times to said input shaft and said output shaft being coupled to each other by a gear set having at least one gear rotatable relative to said one counter or output shaft;
   said other counter shaft coupled at all times to said output shaft and said input shaft being coupled to each other by a gear set having at least one gear rotatable relative to said other counter or input shaft;
   a first clutch being provided such as to be capable of being switched between states of allowing and inhibiting the rotation of said gear rotatable relative to said one counter or output shaft;
   a second clutch being provided such as to be capable of being switched between states of allowing and inhibiting the rotation of said gear rotatable relative to said other counter or input shaft;
   a third clutch being provided such as to be capable of being switched between states of allowing and inhibiting the relative rotation of said first and second counter shafts to each other.

2. The gear speed change system according to claim 1, wherein:
   said one counter and output shafts are coupled to each other by two gear sets each having a gear rotatable relative to said one counter or output shaft;
   said first clutch is capable of being switched between states in which the gear of one of said two gear sets is capable of relative rotation while the gear of the other gear set is incapable of relative rotation, and a state in which the gears of both said gear sets are capable of relative rotation;
   said other counter and input shafts are coupled to each other by two gear sets each having a gear rotatable relative to said other counter or input shaft; and
   said second clutch is capable of being switched between states in which the gear of one of said two gear sets is capable of relative rotation while the gear of the other gear set is incapable of relative rotation, and a state in which the gears of both said two gear sets are capable of relative rotation.

3. The gear speed change system according to claim 1, wherein:
   said one counter and output shafts are coupled to each other by three gear sets each having a gear capable of relative rotation;
   said first clutch is capable of being switched between states in which the gear of one of said three gear sets is incapable of relative rotation while the gears of the other two gear sets are capable of relative rotation, and a state in which the gears of all said three gear sets are capable of relative rotation;
   said other counter and input shafts are coupled to each other by one gear set having a gear capable of relative rotation; and
   said second clutch is capable of being switched between states in which the gear of said one gear set is capable and incapable, respectively, of relative rotation.

4. The gear speed change system according to claim 1, wherein:
   said one counter and output shafts are coupled to each other by one gear set having a gear capable of relative rotation;
   said first clutch is capable of being switched between states in which the gear of said one gear set is capable and incapable, respectively, of relative rotation;
   said other counter and input shafts are coupled to each other by three gear sets each having a gear capable of relative rotation; and
   said second clutch is capable of being switched between states in which the gear of one of said three gear sets is incapable of relative rotation while the gears of the other two gear sets are capable of relative rotation, and a state in which the gears of all said three gear sets are capable of relative rotation.

5. The gear speed change system according to claim 1, wherein:
   said third clutch is disposed at an end of either one of said first and second counter shafts.

6. A gear speed change system comprising an input shaft, an output shaft coaxial therewith, a first counter shaft disposed parallel to said input and output shafts, and a second counter shaft coaxial with said first counter shaft;
   one of said input and output shafts and said first counter shaft being coupled to each other at all times by a gear set having gears respectively rotatable in unison with said one shaft and said first counter shaft and meshing each one another;
   the other one of said input and output shafts and said first counter shaft being coupled to each other by a gear set having a gear rotatable relative to said other or first counter shaft;
   a first clutch being provided such as to be capable of being switched between states of allowing and inhibiting the relative rotation of said gear to said other or first counter shaft;
   one of said input and output shafts and said second counter shaft being coupled to each other at all times by a gear set having gears respectively rotatable in unison with said one shaft and said second counter shaft and meshing each other;

the other one of said input and output shafts and said second counter shaft being coupled to each other by a gear set having a gear rotatable relative to said other or second counter shaft;

a second clutch being provided such as to be capable of being switched between states of allowing and inhibiting the relative rotation of said gear to said other or second counter shaft;

at least either the gear set permitting relative rotation of said first counter and other shafts or the gear set permitting relative rotation of said second counter and other shafts being a common gear set.

7. The gear speed change system according to claim 6, wherein:

three gear sets are disposed between said first counter and other shafts;

two gear sets are disposed between said second counter and other shafts;

said first clutch is capable of being switched between states in which the gear of one of said three gear sets is incapable of relative rotation while the gears of the other gear sets are capable of relative rotation, and a state in which the gears of all said three gear sets are capable of relative rotation; and said second clutch is capable of being switched between states in which the gear of one of said two gear sets is incapable of relative rotation while the gear of the other gear set is capable of relative rotation, and a state in which the gears of said two gear sets are all capable of relative rotation.

8. The gear speed change system according to claim 7, wherein:

an outer one of said three gear sets and one of said two gear sets are constituted by a common gear set.

9. The gear speed change system according to claim 7, wherein:

two gear sets are disposed between said first counter and other shafts;

three gear sets are disposed between said second counter and other shafts;

said first clutch is capable of being switched between states in which the gear of one of said two gear sets is incapable of relative rotation while the gear of the other gear set is capable of relative rotation, and a state in which the gears of said two gear sets are all capable of relative rotation; and said second clutch is capable of being switched between states in which the gear of one of said three gear sets is incapable of relative rotation while the gears of the other two gear sets are capable of relative rotation, and a state in which the gears of said three gear sets are all capable of relative rotation.

10. The gear speed change system according to claim 9, wherein:

an outer one of said three gear sets and one of said two gear sets are constituted by a common gear set.

* * * * *

UNITED STATES PATENT AND TRADEMARK OFFICE
CERTIFICATE OF CORRECTION

PATENT NO. : 5,383,375
DATED : January 24, 1995
INVENTOR(S) : Shinji OGAWA, et al.

It is certified that error appears in the above-indentified patent and that said Letters Patent is hereby corrected as shown below:

On the title page, Item [30], the Foreign Application Priority Date is listed incorrectly. It should read:

--Jul. 2, 1992--

Signed and Sealed this

Sixth Day of June, 1995

*Attest:*

BRUCE LEHMAN

*Attesting Officer*  *Commissioner of Patents and Trademarks*